US008160062B2

(12) United States Patent
Qian et al.

(10) Patent No.: US 8,160,062 B2
(45) Date of Patent: Apr. 17, 2012

(54) NETWORK CONNECTIVITY DETERMINATION BASED ON PASSIVE ANALYSIS OF CONNECTION-ORIENTED PATH INFORMATION

(75) Inventors: Tin Qian, Bellevue, WA (US); James Talbut, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 11/702,478

(22) Filed: Feb. 5, 2007

(65) Prior Publication Data

US 2007/0177524 A1    Aug. 2, 2007

Related U.S. Application Data

(63) Continuation-in-part of application No. 11/345,189, filed on Jan. 31, 2006, now Pat. No. 7,711,800.

(51) Int. Cl.
H04L 12/28 (2006.01)
H04J 1/16 (2006.01)
G08C 15/00 (2006.01)
G06F 11/00 (2006.01)
G01R 31/08 (2006.01)

(52) U.S. Cl. ........ 370/389; 370/229; 370/250; 370/469; 709/219

(58) Field of Classification Search .......... 370/252–395, 370/216–241, 412–474, 250; 709/200–250
See application file for complete search history.

(56) References Cited

U.S. PATENT DOCUMENTS

| | | |
|---|---|---|
| 5,097,469 A | 3/1992 | Douglas |
| 5,497,460 A * | 3/1996 | Bailey et al. ............ 714/39 |
| 5,892,903 A | 4/1999 | Klaus |
| 5,982,753 A | 11/1999 | Pendleton et al. |
| 6,088,804 A | 7/2000 | Hill et al. |
| 6,415,313 B1 * | 7/2002 | Yamada et al. ............ 709/200 |
| 6,415,329 B1 | 7/2002 | Gelman et al. |
| 6,711,137 B1 | 3/2004 | Klassen et al. |
| 6,807,156 B1 | 10/2004 | Veres et al. |
| 6,859,829 B1 | 2/2005 | Parupudi et al. |
| 6,934,290 B2 * | 8/2005 | Story ............... 370/395.1 |
| 6,938,080 B1 | 8/2005 | Kahveci et al. |
| 6,941,384 B1 * | 9/2005 | Aiken et al. ............ 709/250 |
| 6,993,584 B2 | 1/2006 | Border et al. |
| 6,996,631 B1 * | 2/2006 | Aiken et al. ............ 709/242 |
| 7,007,089 B2 * | 2/2006 | Freedman ............ 709/225 |
| 7,007,302 B1 | 2/2006 | Jagger et al. |

(Continued)

OTHER PUBLICATIONS

Agarwal, et al., "An Infrastructure for Passive Network Monitoring of Application Data Streams", http://congo.postech.ac.kr/PAPER/MONITORING/PAM/2003/agarwal.pdf.

(Continued)

*Primary Examiner* — Man Phan
(74) *Attorney, Agent, or Firm* — Microsoft Corporation

(57) ABSTRACT

Passive analysis connection detection architecture that leverages connection-oriented end-to-end stack protocol information. In a TCP/IP implementation, by passively leveraging TCP information, a given system can determine in a more realtime fashion the connectivity state of a TCP pathway. Additionally, other passive information from the TCP/IP stack such as send/receive packet counts can be considered. Based on analysis of TCP path information and/or send/receive packet counts, loss of certain network connectivity can be inferred, which greatly improves the accuracy and responsiveness of detecting network connectivity losses. The disclosed architecture also facilitates improved performance when using proxy systems for network connectivity so as to reduce unnecessary network traffic and to route network systems to other online systems in a more efficient and effective manner.

20 Claims, 24 Drawing Sheets

U.S. PATENT DOCUMENTS

| | | | |
|---|---|---|---|
| 7,080,141 | B1 | 7/2006 | Baekelmans et al. |
| 7,082,467 | B2 | 7/2006 | Border et al. |
| 7,152,105 | B2 | 12/2006 | McClure et al. |
| 7,203,753 | B2 | 4/2007 | Yeager et al. |
| 7,430,611 | B2 * | 9/2008 | Aiken et al. ............ 709/238 |
| 7,596,097 | B1 | 9/2009 | McCowan et al. |
| 7,774,361 | B1 | 8/2010 | Nachenberg et al. |
| 7,817,668 | B2 * | 10/2010 | Igarashi et al. ............ 370/474 |
| 2002/0147837 | A1 | 10/2002 | Heller |
| 2002/0150041 | A1 * | 10/2002 | Reinshmidt et al. ......... 370/216 |
| 2003/0014665 | A1 | 1/2003 | Anderson et al. |
| 2003/0018585 | A1 | 1/2003 | Butler et al. |
| 2003/0018930 | A1 | 1/2003 | Mora et al. |
| 2003/0023876 | A1 | 1/2003 | Bardsley et al. |
| 2003/0028614 | A1 | 2/2003 | Jeon |
| 2003/0043802 | A1 | 3/2003 | Yazaki et al. |
| 2003/0159069 | A1 | 8/2003 | Choi et al. |
| 2003/0163729 | A1 | 8/2003 | Buchegger |
| 2003/0177213 | A1 * | 9/2003 | Wallace et al. ............ 709/223 |
| 2003/0217173 | A1 | 11/2003 | Butt et al. |
| 2004/0083408 | A1 | 4/2004 | Spiegel et al. |
| 2004/0109477 | A1 | 6/2004 | Lee et al. |
| 2004/0187032 | A1 | 9/2004 | Gels et al. |
| 2005/0052998 | A1 | 3/2005 | Oliver et al. |
| 2005/0091355 | A1 | 4/2005 | Keohane et al. |
| 2005/0259633 | A1 * | 11/2005 | Kato ............ 370/351 |
| 2005/0283527 | A1 | 12/2005 | Corrado et al. |
| 2006/0004918 | A1 | 1/2006 | Lubeck et al. |
| 2006/0095970 | A1 | 5/2006 | Rajagopal et al. |
| 2006/0129382 | A1 | 6/2006 | Anand et al. |
| 2006/0153200 | A1 | 7/2006 | Filsfils et al. |
| 2006/0182036 | A1 | 8/2006 | Sasagawa et al. |
| 2006/0224709 | A1 * | 10/2006 | Johnson et al. ............ 709/223 |
| 2006/0242268 | A1 | 10/2006 | Omernick et al. |
| 2006/0253458 | A1 | 11/2006 | Dixon et al. |
| 2006/0272018 | A1 | 11/2006 | Fouant |
| 2006/0294579 | A1 | 12/2006 | Khuti et al. |
| 2007/0005787 | A1 * | 1/2007 | Igarashi et al. ............ 709/230 |
| 2007/0094725 | A1 | 4/2007 | Borders |
| 2007/0127393 | A1 * | 6/2007 | Car ............ 370/254 |
| 2007/0169194 | A1 | 7/2007 | Church et al. |
| 2008/0025218 | A1 * | 1/2008 | Liu ............ 370/235 |

OTHER PUBLICATIONS

Balakrishnan, et al., "TCP Behavior of a Busy Internet Server: Analysis and Improvements", http://nms.lcs.mit.edu/~hari/papers/infocom98.ps.gz.

Padmanabhan, et al., "Network Tomography Using Passive End-to-End Measurements", http://research.microsoft.com/~padmanab/papers/dimacs2002.pdf.

Paxson Vern, "End-to-End Internet Packet Dynamics", Date: Jun. 1999, vol. 7, http://delivery.acm.org/10.1145/320000/312234/00779192.pdf?key1=312234&key2=0458187611&coll=GUIDE&dl=GUIDE&CEID=10427251&CETOKEN=17506759.

Non-Final Office Action cited in related U.S. Appl. No. 11/345,189 dated May 13, 2009.

Notice of Allowance cited in related U.S. Appl. No. 11/345,189 dated Jan. 11, 2010.

Non-Final Office Action cited in related U.S. Appl. No. 11/893,934 dated Aug. 18, 2010.

Non-Final Office Action cited in related U.S. Appl. No. 11/893,934 dated Feb. 4, 2011.

Final Office Action cited in related U.S. Appl. No. 11/893,934 dated Jun. 23, 2011.

Int. Search Report cited in related PCT Application No. PCT/US2008/057742 dated Jul. 23, 2008.

Int. Preliminary Report on Patentability cited in related PCT Application No. PCT. PCT/US2008/057742 dated Oct. 29, 2009.

"NIST Special Publication on Intrusion Detection Systems", Rebecca Bace and Peter Mell, 2007, downloaded at: http://www.21cfrpart11.com/files/library/reg_guid/docs/nist_intrusiondetectionsys.pdf, pp. 1-51.

"Aspects of Adapting Data Collection to Intrusion Detection", Ulf Larson, Thesis for the Degree of Licentiate of Engineering, Department of Computer Science and Engineering, Chalmers University of Technology, Goteborg, Sweden, 2006.

"State of the Practice of Intrusion Detection Technologies", Julia Allen, Alan Christie, William Fithen, John McHugh, Jed Pickel and Ed Stoner, Networked Systems Survivability Program, Jan. 2000.

* cited by examiner

NETWORK CONNECTIVITY DETERMINATION BASED ON PASSIVE ANALYSIS OF CONNECTION-ORIENTED PATH INFORMATION

CROSS-REFERENCE TO RELATED APPLICATIONS

This application is a Continuation-in-Part of application Ser. No. 11/345,189, now U.S. Pat. No. 7,711,800 entitled "NETWORK CONNECTIVITY DETERMINATION" and filed Jan. 31, 2006 the entirety of which is incorporated by reference herein.

BACKGROUND

Communications connectivity is quickly becoming an important issue given the increasing reliance by companies and individuals alike on networks for conducting business, for example. The widespread proliferation of computing devices (e.g., desktop and portable computers, cell phones, . . . ) in use today for communications purposes means that networks now, more than ever, need to be reliable not only for customer satisfaction reasons, but also for the reliable communication of information. In other words, connectivity should be transparent to the user or the system. Nothing can effect consumer satisfaction or business viability more than connectivity failures. The loss of data and frustration by users related to connectivity can quickly affect the bottom-line of a company. Moreover, in back-end systems, for example, lack of reliable connectivity frustrates the timely communication of information needed by other systems.

Unfortunately, existing mechanisms lack timely response to connection interruption or failure. Typically, conventional network services operate to report connection failures after it is too late to react or recover, thereby dropping the connection and frustrating the user or other connection entities, and introducing unnecessary network traffic that in many instances could bring down a node (e.g., a website). In other words, existing mechanisms are unable to report realtime health assessment of a network (e.g., the Internet) to the users or systems that are meaningful to their daily tasks such as web browsing, conferencing, etc. For example, if connection failure was determined in a more timely manner (e.g., realtime), then useful diagnostics could be employed by the users and/or systems for determining where the problem might be (e.g., local Internet service provide (ISP)) network or the network backbone.

Additionally, because of this lack of realtime support for determining connectivity, the impact on system applications can be dramatic. Applications that rely on this connectivity information such as update programs and anti-virus programs need connectivity information to be readily and reliably available so as to not unnecessarily expend processing time and inject packets into an already failed connection. This problem becomes particularly burdensome in network systems (e.g., enterprise) that employ proxy servers as an interface to other networks. For example, a client communicates to the proxy, and then the proxy communicates to a website on behalf of the client. Should the website be offline, this is not known by the client, and the client can continue to send packets to the proxy, thereby potentially bring down the proxy, where a large number of clients are using the proxy. Moreover, using active connectivity detection methods introduces packets into the network that can further burden the network.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture improves on an earlier network connectivity determination method (U.S. Pat. No. 7,711,800) by leveraging connection-oriented end-to-end stack protocol information already available. For example, in a TCP/IP implementation, by passively leveraging TCP (transmission control protocol) information, a given system can determine in a more realtime fashion the connectivity state of a TCP pathway. Additionally, other passive information from the TCP/IP stack such as send/receive packet counts can be considered.

Based on analysis of TCP path information and/or send/receive packet counts, loss of certain network connectivity can be inferred, which greatly improves the accuracy and responsiveness of detecting network connectivity losses. In addition, the disclosed architecture also facilitates improved determination of network connectivity (e.g., the Internet) in the presence of network (or web) proxy server systems.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
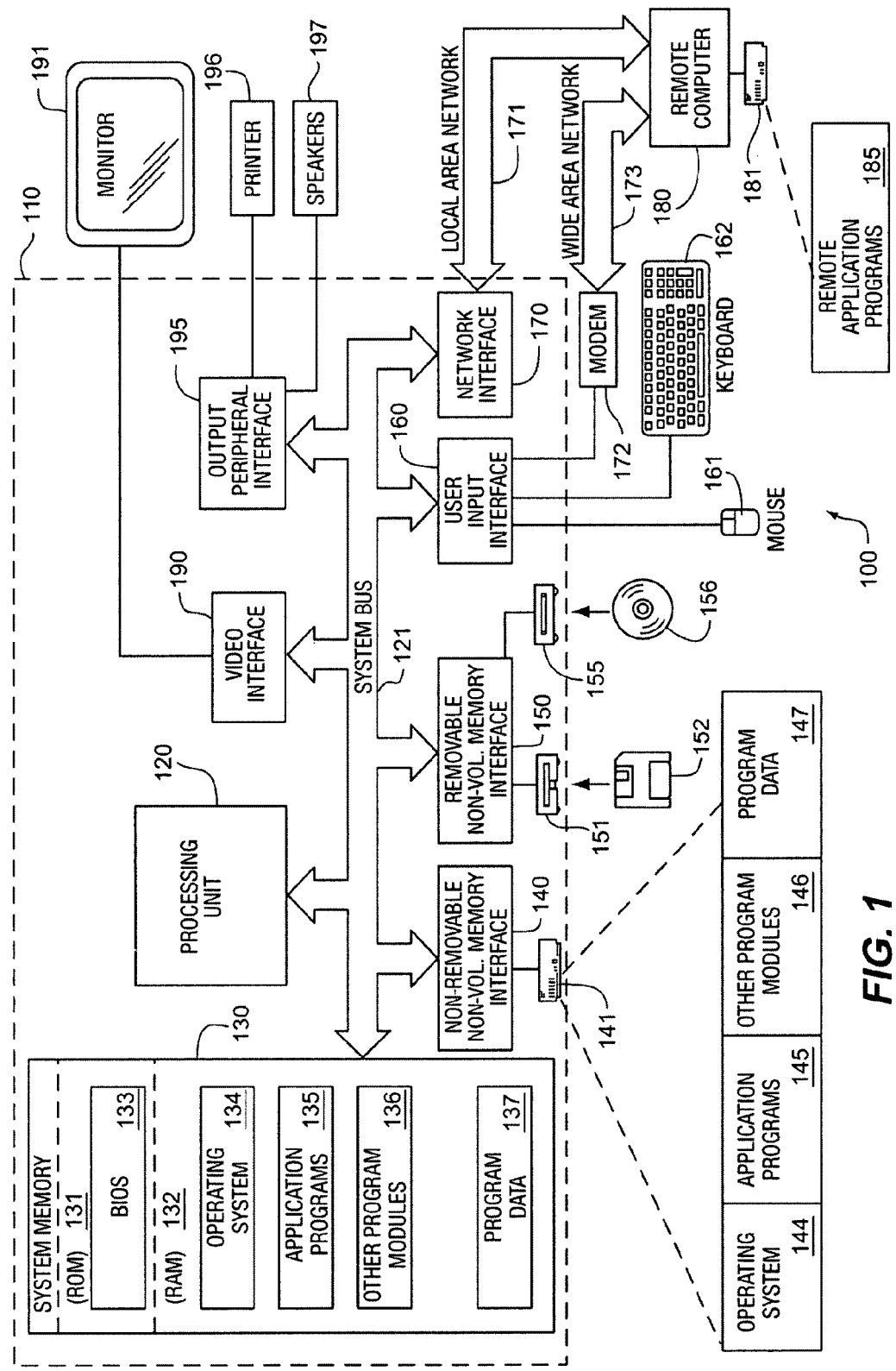
FIG. 1 illustrates a block diagram of a computing system that can operate in accordance with the claims.

In one aspect described herein, the disclosed passive analysis architecture leverages connection-oriented end-to-end stack protocol information already available to determine in a more realtime fashion the connectivity state of a connection pathway. Based on analysis of path information (e.g., TCP-transmission control protocol) and/or send/receive packet counts, loss of certain network connectivity can be inferred, which greatly improves the accuracy and responsiveness of detecting network connectivity losses.

The innovation is now described with reference to the drawings, wherein like reference numerals are used to refer to like elements throughout. In the following description, for purposes of explanation, numerous specific details are set forth in order to provide a thorough understanding thereof. It can be evident, however, that the innovation can be practiced without these specific details. In other instances, well-known structures and devices are shown in block diagram form in order to facilitate a description thereof.

Referring now to the drawings, FIG. 1 illustrates an exemplary computing system environment 100 on which a system for the steps of the claimed method and apparatus can be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that can be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus can be described in the general context of computer-executable instructions, such as program modules, being executed by a computer. Generally, program modules include routines, programs, objects, components, data structures, etc., that perform particular tasks or implement particular abstract data types. The methods and apparatus can also be practiced in distributed computing environments where tasks are performed by remote processing devices that are linked through a communications network. In a distributed computing environment, program modules can be located in both local and remote computer storage media including memory storage devices.

With reference again to FIG. 1, an exemplary system includes a general purpose computing device in the form of a computer 110. Components of computer 110 can include, but are not limited to, a processing unit 120, a system memory 130, and a system bus 121 that couples various system components including the system memory to the processing unit 120. The system bus 121 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and PCIe (or PCI express).

Computer 110 typically includes a variety of computer readable media. Computer readable media can be any available media that can be accessed by computer 110 and includes both volatile and nonvolatile media, removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 can also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user can enter commands and information into the computer 20 through input devices such as a keyboard 162 and pointing device 161, commonly referred to as a mouse, trackball or touch pad. Other input devices (not shown) can include a microphone, joystick, game pad, satellite dish, scanner, or the like. These and other input devices are often connected to the processing unit 120 through a user input interface 160 that is coupled to the system bus, but can be connected by other interface and bus structures, such as a parallel port, game port or a universal serial bus (USB). A monitor 191 or other type of display device is also connected to the system bus 121 via an interface, such as a video interface 190. In addition to the monitor, computers can also include other peripheral output devices such as speakers 197 and printer 196, which can be connected through an output peripheral interface 190.

The computer 110 can operate in a networked environment using logical connections to one or more remote computers, such as a remote computer 180. The remote computer 180 can be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but can also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which can be internal or external, can be connected to the system bus 121 via the user input interface 160, or other appropriate mechanism. In a networked environment, program modules depicted relative to the computer 110, or portions thereof, can be stored in the remote memory storage device. By way of example, and not limitation, FIG. 1 illustrates remote application programs 185 as residing on memory device 181. It will be appreciated that the network connections shown are exemplary and other means of establishing a communications link between the computers can be used.

Figure 2:
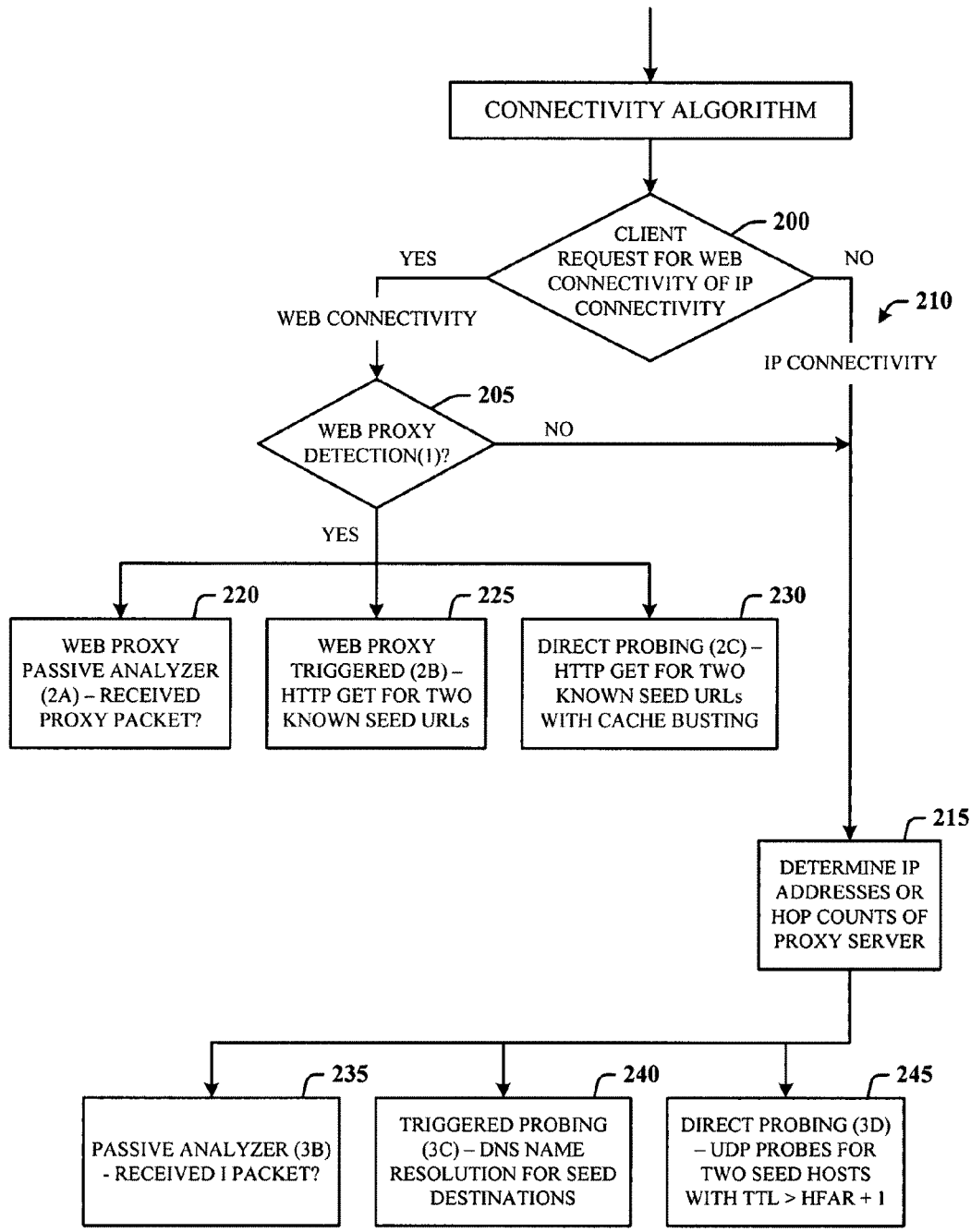
FIG. 2 illustrates of a method for determining network connectivity.

FIG. 2 illustrates a method of determining network connectivity. At block 200, the method can be called when an application wants to query the connectivity status. In general, there are two basic types of connectivity: web connectivity (e.g., connectivity to web sites via HTTP) and general IP connectivity. Block 200 checks which connectivity type the application is interested in and follows different paths in determining the connectivity status. If the application is interested in web connectivity, and web proxies are detected at block 205, web proxy passive analyzer at block 220, active web probing at block 225 and direct probing at 230 are used. Otherwise, general IP passive analyzer at block 235 and/or active DNS (domain name server) probing at block 240 and 245 are used instead.

Figure 3:
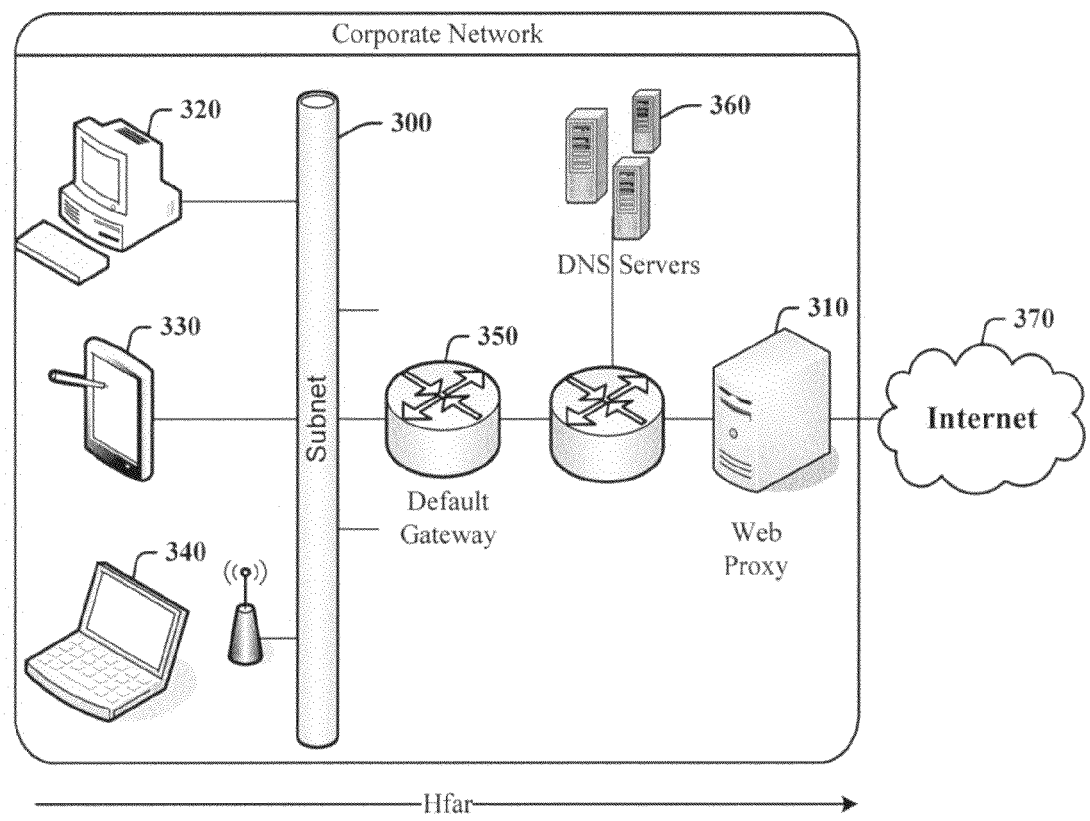
FIG. 3 illustrates corporate Internet access using a web proxy.

FIG. 3 illustrates corporate Internet access using a web proxy 310. The corporation can have a subnet 300 which users access either through wired access such as in the case of desktop 320 or handheld 330 or through wireless access using a laptop 340, for example. The subnet 300 can use the default gateway 350 to access the Internet 370 and DNS servers 360. Web requests can be served from the web proxy 310 if the pages are in the proxy's cache, or if not, the request can be served from the Internet 370.

Figure 4:
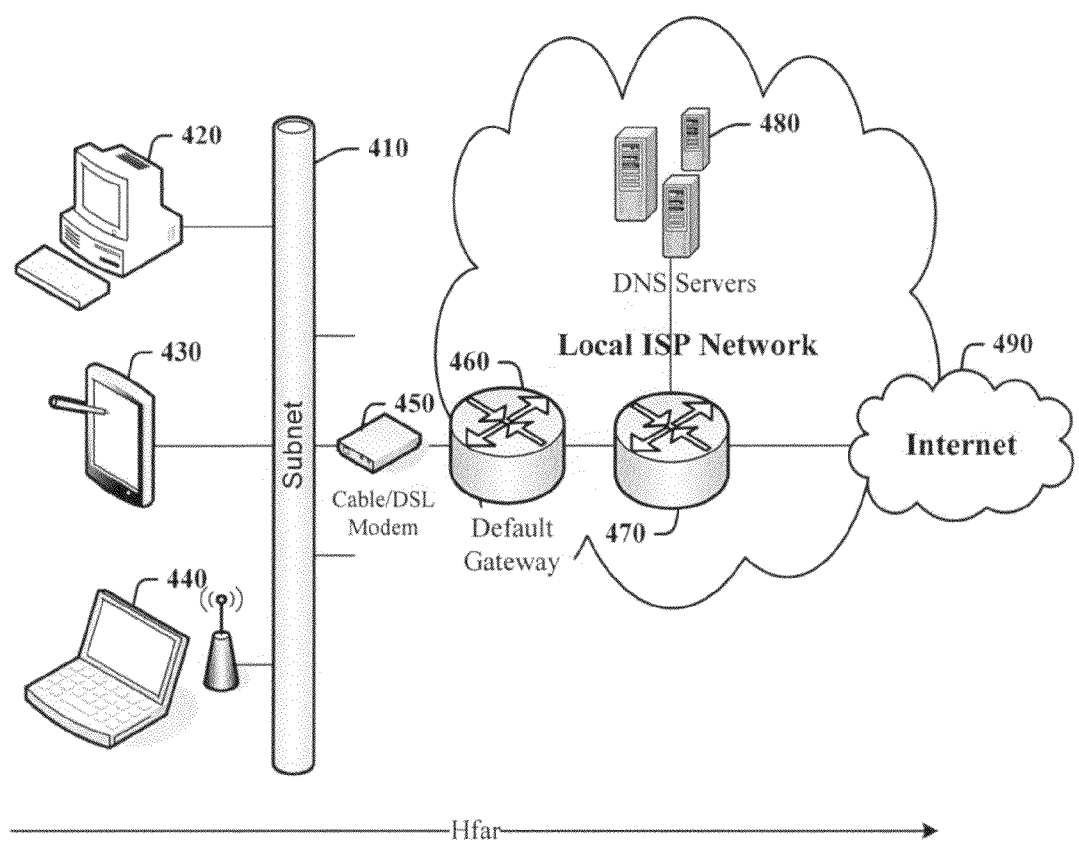
FIG. 4 illustrates home Internet access using an Internet service provider.

FIG. 4 illustrates home Internet access using an Internet service provider (ISP). The home can have a subnet 410 which users access either through wired access such as in the case of desktop 420 or handheld 430 or through wireless access using a laptop 440, for example. The subnet 410 can use a modem 450 to access a default gateway 460 inside the ISP's network 470. Also inside the ISP's network 470 can be DNS servers 480. A request from the subnet 410 can reach the Internet 490 via the ISP network 470.

Figure 5:
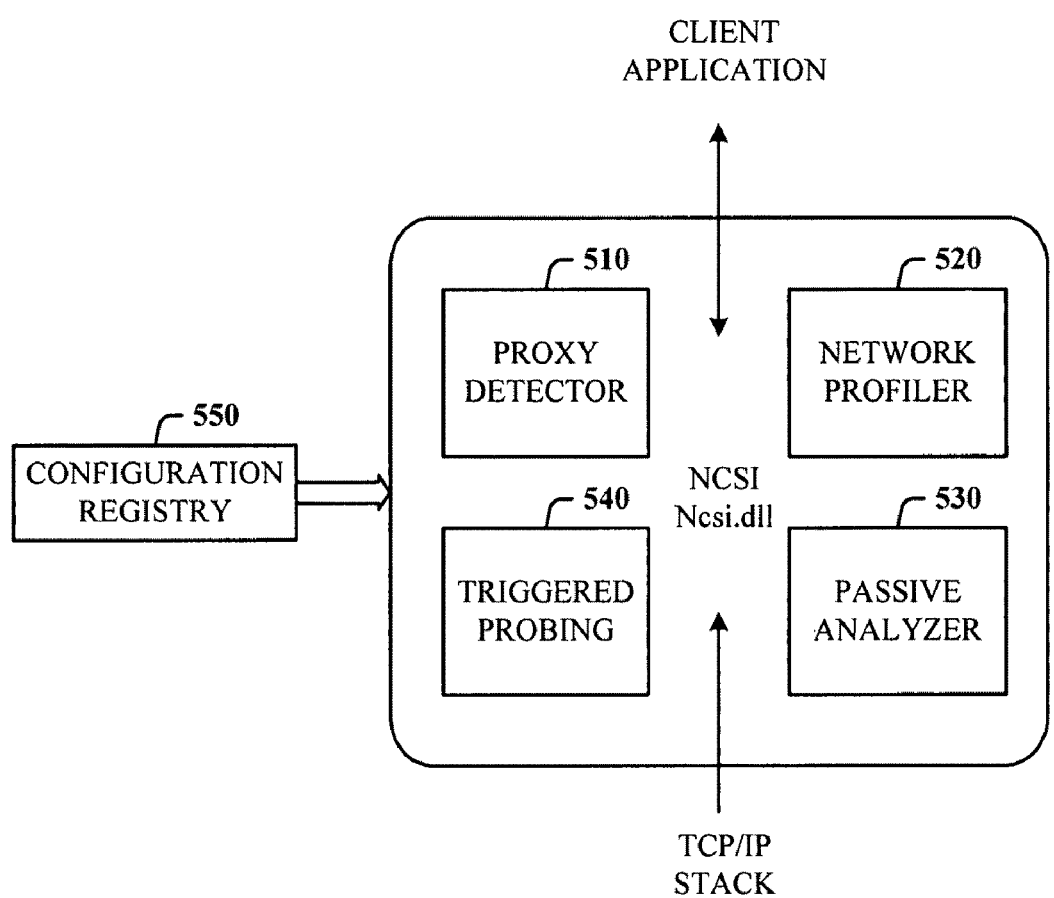
FIG. 5 illustrates the main software components that can be used to implement the method.

FIG. 5 illustrates client applications that register for network connectivity status information. There can be four major pieces comprised by a network connectivity status indicator (NCSI), shown in FIG. 5. A proxy detector 510 can detect the presence of a web proxy or transparent proxy or DNS spoofing in the network connected to the PC. A network profiler 520 can perform a lightweight profiling of the networks connected to the PC and stores the network metrics (e.g., Hfar, Hnear) in a cache. Profiling can be performed after a network-change notification is received from the TCP/IP stack. A passive analyzer 530 can periodically query the TCP/IP stack for packets received from remote destinations, store the network status, and inform client applications of changes to the network connectivity status. A triggered probing 540 can be used when lack of network activity renders the passive analyzer 530 ineffective. The triggered probing 540 can be relied upon to perform lightweight probes to determine network connectivity status. In addition, a list (e.g., twenty five) of seed host names, corresponding URLs, and IP addresses can be stored in a configuration store or registry 550. The hosts can be spread across the Internet which can be proximate by using sites that are in different geographic locations.

Referring again to FIG. 2, for web connectivity, the presence of a web caching proxy can be determined 205. In the absence of a web caching proxy, IP connectivity 210 can be used to indicate web connectivity. Both web and IP connectivity have the following three provisions for determining connectivity: passive analyzer for passively determining the connectivity status; triggered probing for determining the connectivity status on various triggering events such as network signature changes (e.g., address changes, default gateway changes); and, direct probing for determining the connectivity status when applications need quick and fresh connectivity information.

Figure 6:
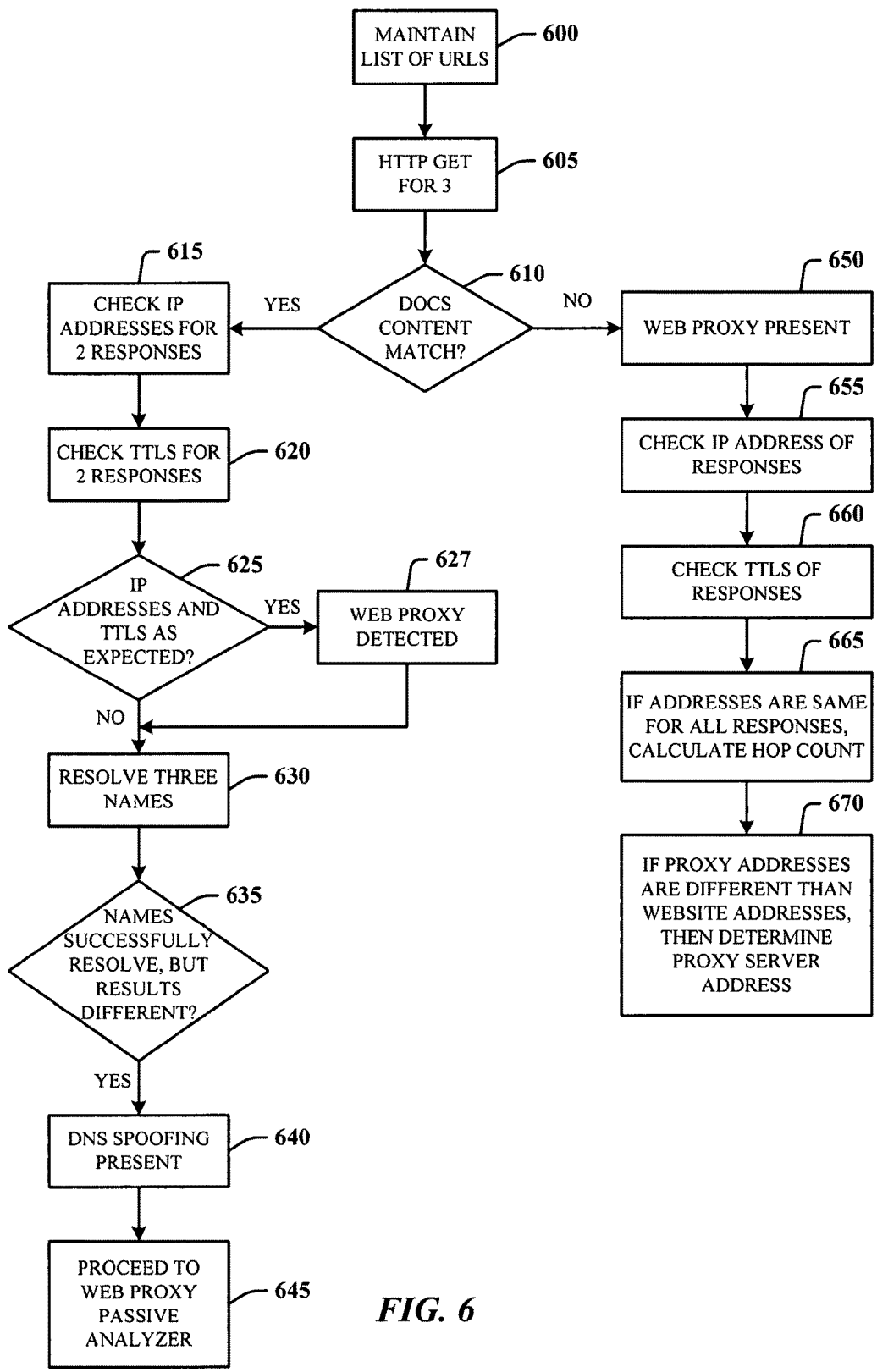
FIG. 6 illustrates a method of web proxy detection and network profiling.

FIG. 6 illustrates a method of web proxy detection. At block 600, a list (e.g., twenty five) of seed URLs hosted on geographically spread local sites such as msn.dk, msn.be, msn.co.in, msn.co.jp, msn.co.kr, msn.co.za, msn.com.mx, msn.com.sg, msn.com.cn, msn.com.hk, msn.com.au, msn.com.br, and msn.com.tw, along with the IP addresses of the hosts, can be maintained such as in registry 550.

The method can perform HTTP GETs for three seed URLs randomly chosen from the seed URL list 600. HTTP GET can fetch an HTTP URL. At block 610, the method can determine whether all the HTTP GET responses match the expected content. If the determination at block 610 is yes, the method continues to block 615. If the content does not match, a proxy can be present and control can pass to block 650. Returning to block 615, the method can check for the IP addresses for two responses, at 615, and the TTLs (time-to-live packets) for the two responses, at 620. The TTL can indicate the number of hops the packet traveled. For example, common fixed initial TTL values are 255, 128, 64 and 32 and the TTL can be reduced for each hop. By reviewing the received TTL to the most logical TTL start value, the number of hops the packet traveled can be determined. If the IP addresses and TTLs are the same as expected, the method can determine that a web proxy is present 627 and control can pass to block 630.

At block 630, the method can perform name resolutions for three names. The method can determine whether any name successfully resolves but the results are different from the expected result 635. If the determination is yes, the presence of DNS spoofing can be detected 640, as is prevalent at hotels, airports, or libraries and web connectivity can not be present 645 and control can pass to the web proxy passive analyzer.

Returning to block 650, the method can determine that a web proxy is present. At block 655, the method can check the IP address of responses, and at block 660, the method can check the TTLs of the responses. At block 665, if the IP addresses are the same for all response, then the method can calculate the hop count for the proxy server. At block 670, if the proxy addresses are different than the website addresses, then the method can determine the proxy server IP address.

Web Proxy Passive Analyzer

Figure 7:
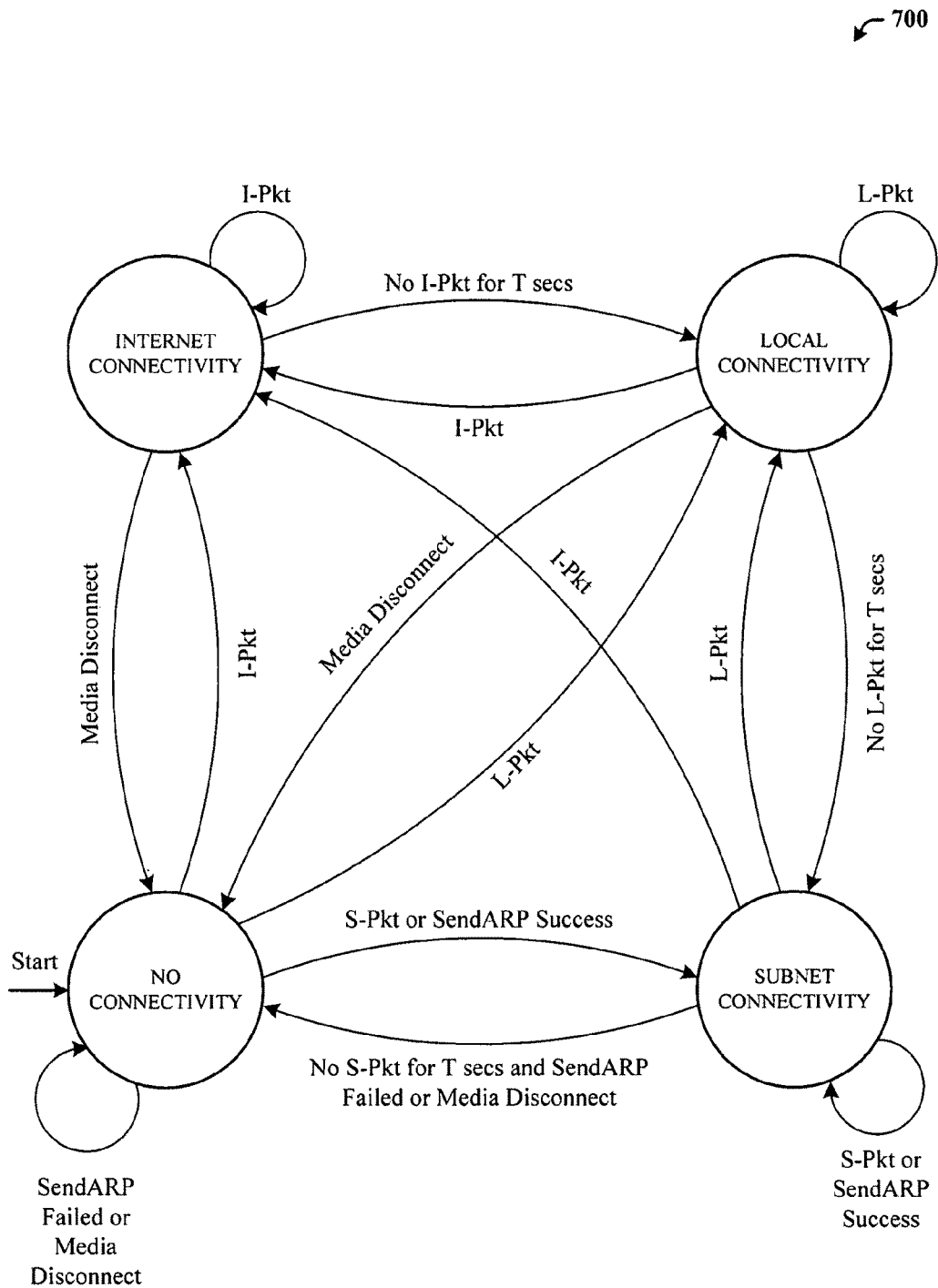
FIG. 7 illustrates a passive network state analyzer.

Packets can be monitored both actively and passively. By monitoring passively, no impact will be made to the servers and the network infrastructure. Thus this makes it possible to have a large scale deployment. In a few rare situations, active probing can be necessary to improve the accuracy of network connectivity determination. FIG. 7 summarizes the connectivity states in a state diagram 700 maintained by a passive analyzer per interface. At a high level, the method will determine if packets have been received beyond certain limits, such as the limit of the connecting ISP (Hfar). Hfar can refer to the number of hops on a path to the edge of the ISP network. The edge of the ISP network can be identified using some heuristics, for example, a change of the first octet in the non-private IP address of the intermediate routers.

If the router is not beyond the ISP, the first octet of the IP address will be the same. If the router is beyond the ISP, the first octet of the IP address will be most likely different. In a home environment, Hfar can commonly be between five and eight. In a corporate environment that employs proxy servers, Hfar can be the hops to the proxy server. Proxy servers can be detected from the list of the routers when all source routers are the same for requests with a TTL beyond a certain value, such as beyond Hfar hops. In one embodiment, Hfar can be set to a default value and Hfar can be adjusted to the hop count to the proxy server based on received packets. There are three types of packets: I-packets arrive from an IPv4 source beyond Hfar, or from an IPv6 source outside the IPv6 site; L-packets arrive from an IPv4 source outside the IPv4 subnet but before Hfar, or from an IPv6 source outside the IPv6 subnet but within the IPv6 site; and, S-packets arrive from a source with the same subnet prefix.

Figure 8:
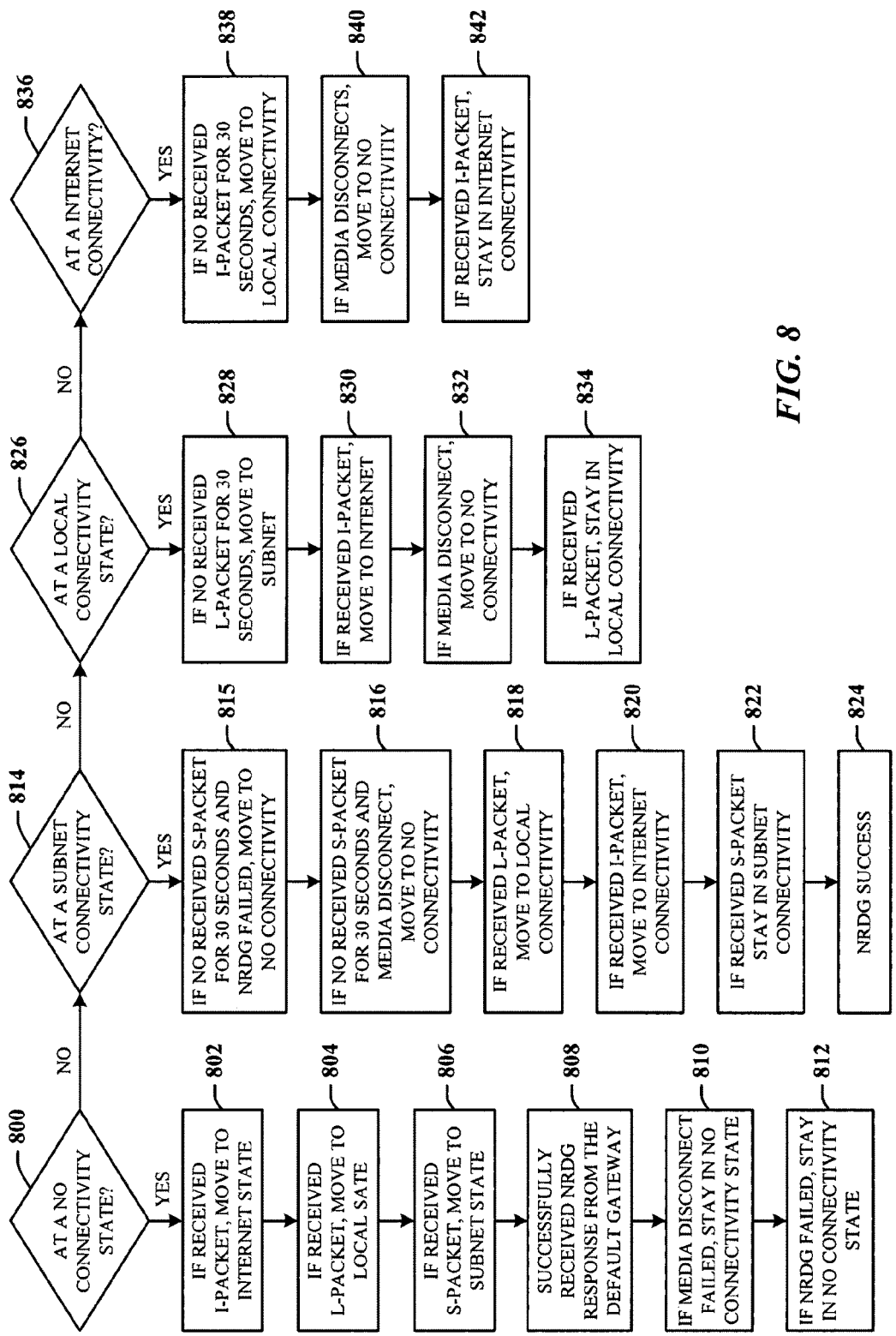
FIG. 8 illustrates an alternative implementation of a passive network state analyzer.

FIG. 8 illustrates concepts of FIG. 7 in written form. The method can passively determine connectivity with states. If at a no connectivity state 800, move to Internet state if received I-packet 802, to local state if received L-packet 804, to subnet state if received S-packet 806 or successfully received neighbor resolution response (for IPv4 and IPv6) from the default gateway 808, and stay in no connectivity state if media disconnect 810 or neighbor resolution of the default gateway (NRDG) failed 812, where it sends an address resolution response (ARP) request for IPv4 or neighbor solicitation request for IPv6 to obtain the physical address that corresponds to the specified destination IP address.

If at a subnet connectivity state 814, move to no connectivity state 800 if no received S-packet for thirty seconds (see below for improvements using the connection oriented path information) and neighbor resolution of the default gateway failed 815 media disconnect 816, move to local connectivity state if received L-packet 818, move to Internet connectivity state if received I-packet 820, and stay in subnet connectivity state if received S-packet 822 or neighbor resolution of the default gateway success 824.

If at a local connectivity state 826, move to subnet connectivity state if no received L-packet for thirty seconds 828 (see below for improvements using the connection oriented path information), move to Internet connectivity state if received I-packet 830, move to no connectivity state if media disconnect 832, and stay in local connectivity state if received L-packet 834.

If at Internet connectivity state 836, more to local connectivity state if no received I-packet for thirty seconds 838 (see below for improvements using the connection oriented path information), move to no connectivity state if media disconnects 840, and stay in Internet connectivity state if received I-packet 842.

If any client application has registered for network connectivity status notifications, the passive analyzer can periodically poll the TCP/IP stack every five seconds for the number of packets received from remote destinations. If a packet arrives from the Web cache proxy (referred to as Proxy packet), with a match of proxy IPs or TTLs, the presence of Internet connectivity is indicated. In the absence of a Proxy packet for thirty seconds (see below for improvements using the connection oriented path information), the arrival of I-packets is relied upon to indicate Web Internet connectivity.

In the case of DNS spoofing or other forms of browser hijacking that are typical in hot spot settings, an HTTP GET for two seed URLs can be performed periodically until a content match occurs or no registered clients remain. If matching occurs, the method can proceed to Network Profiling 215 (FIG. 2).

Web Proxy Triggered Probing

Figure 9:
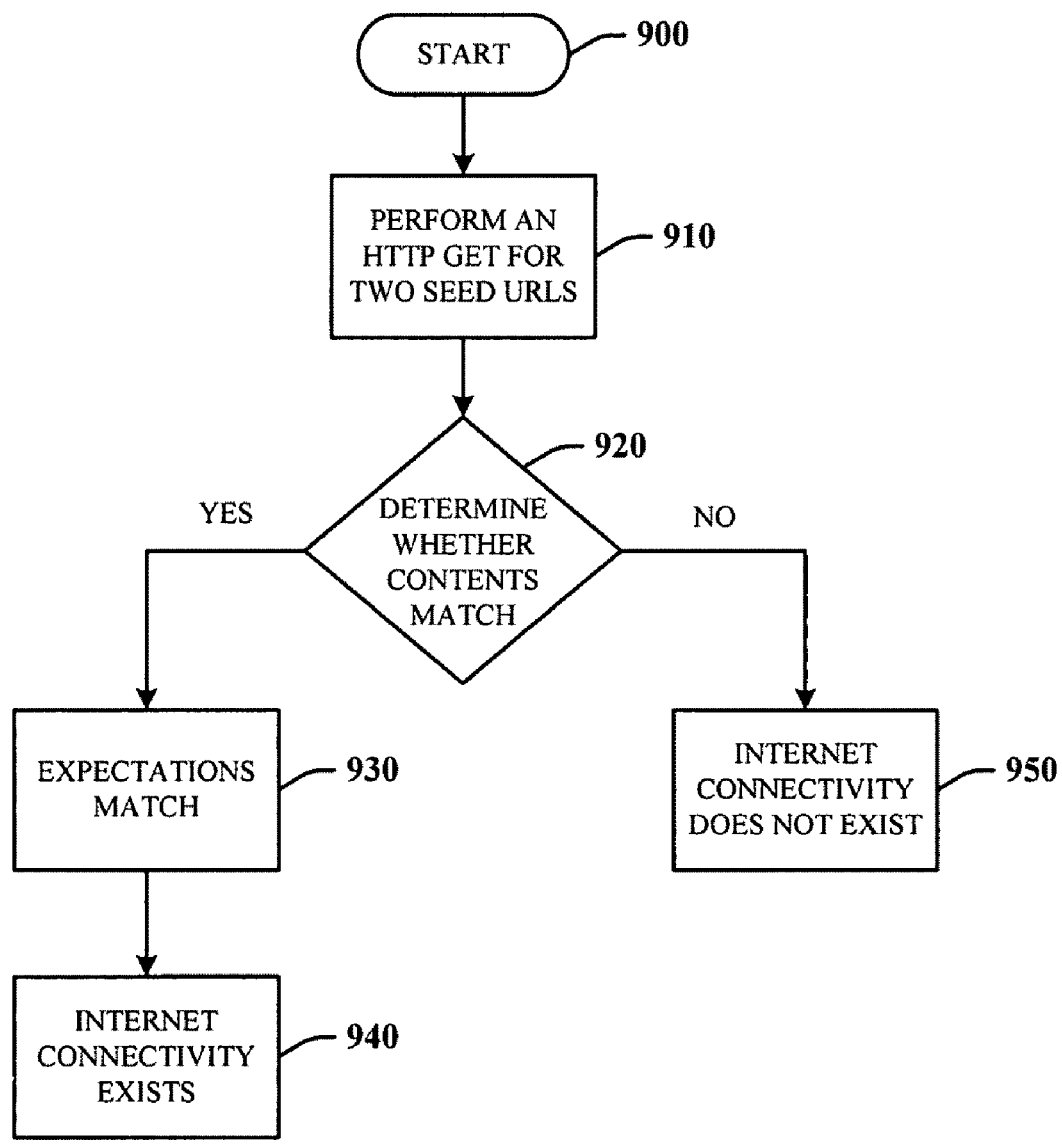
FIG. 9 illustrates triggered web probing via HTTP.

FIG. 9 illustrates a method of web proxy triggered probing. The method can begin at block 900. At block 910, the method can perform an HTTP GET for two seed URLs using seed host IP addresses. At block 920, the method can determine whether the contents of the response to the HTTP GET match expected results. If the expectations match 930, Internet connectivity exists 940. If the expectations do not match 950, Internet connectivity does not exist. Note the Response for the seed URLs is of very small size (e.g., two bytes) and can contain control header fields with max-age specified as sixty seconds and force-revalidation turned on.

Direct Web Probing

Figure 10:
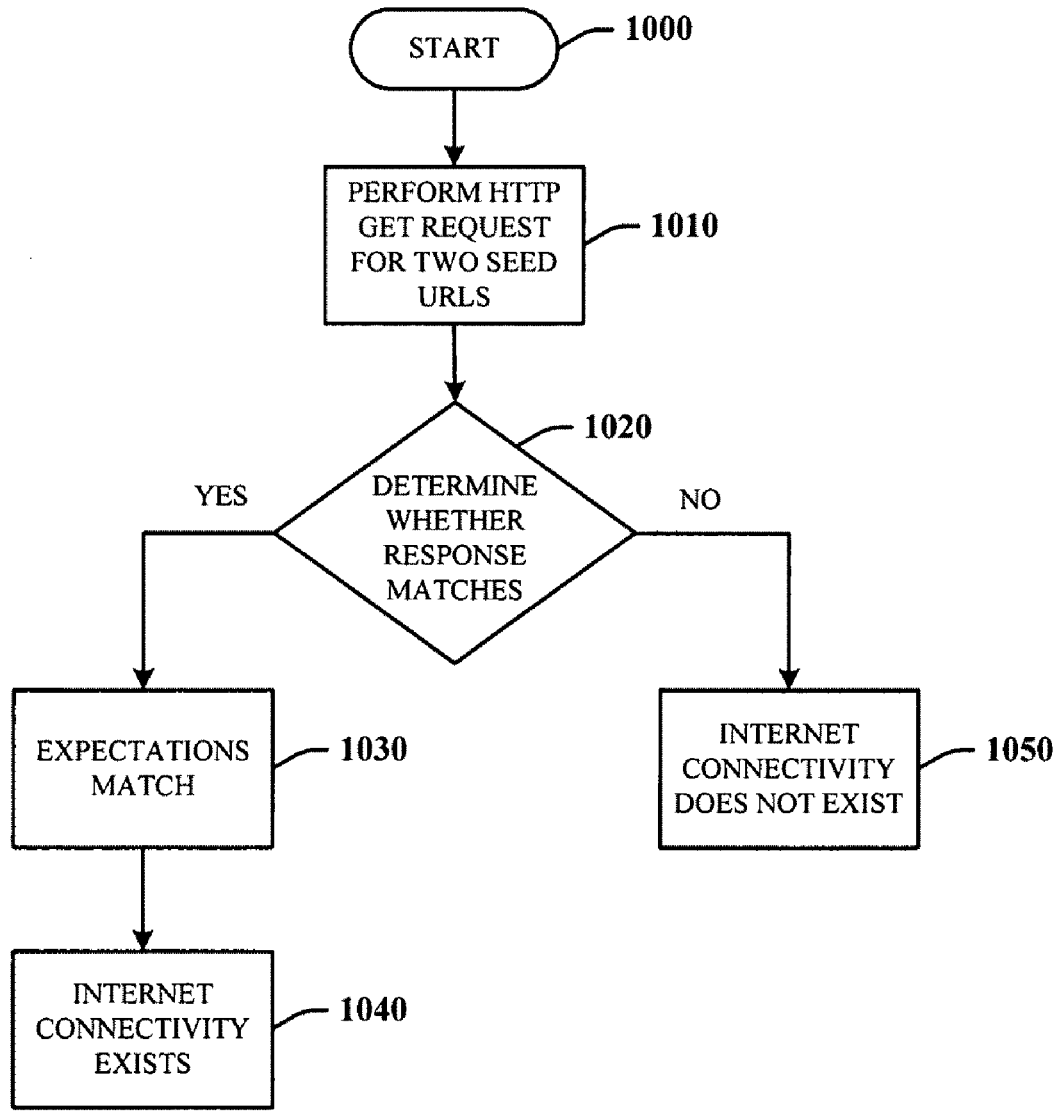
FIG. 10 illustrates direct web probing via HTTP.

FIG. 10 illustrates a method of direct web probing. The method can begin at block 1000. The method can perform HTTP GET requests for the two seed URLs using the host IPs with "no-cache" directive, i.e., bypass the Web proxy cache 1010. At block 1020, the method can determine whether a response is received with content matching the expected content. If the determination is yes 1030, block 1040 can indicate Internet connectivity exists. If the determination is no, block 1050 can indicate Internet connectivity does not exist.

Referring back to FIG. 2, if the method determines the request is for IP connectivity 210, the method can proceed to block 215 for Network Profiling which can involve determining Hfar. Network Profiling can be undertaken to refine Hfar characteristics of a network. Hfar can be set to a default value of Hfar (e.g., 8) if profiling is disabled or not yet complete. Profiling can be triggered by event notifications from the TCP/IP stack when a new network is connected, determined by its subnet address and the MAC address of its default gateway. In order to prevent synchronized profiling, it is performed after waiting for a random time after the triggering event. In addition, the profiling information like Hfar and Hnear can be cached along with the network subnet address and the MAC address of its default gateway to reduce the frequency of profiling. A new profiling is necessary for the same network only if the last profile takes place more than a month ago.

Services that need Internet connectivity information before profiling can rely on Passive Analyzer 235 (which uses default Hfar value) or on Triggered Probings 240 for fresh connectivity information.

Figure 11:
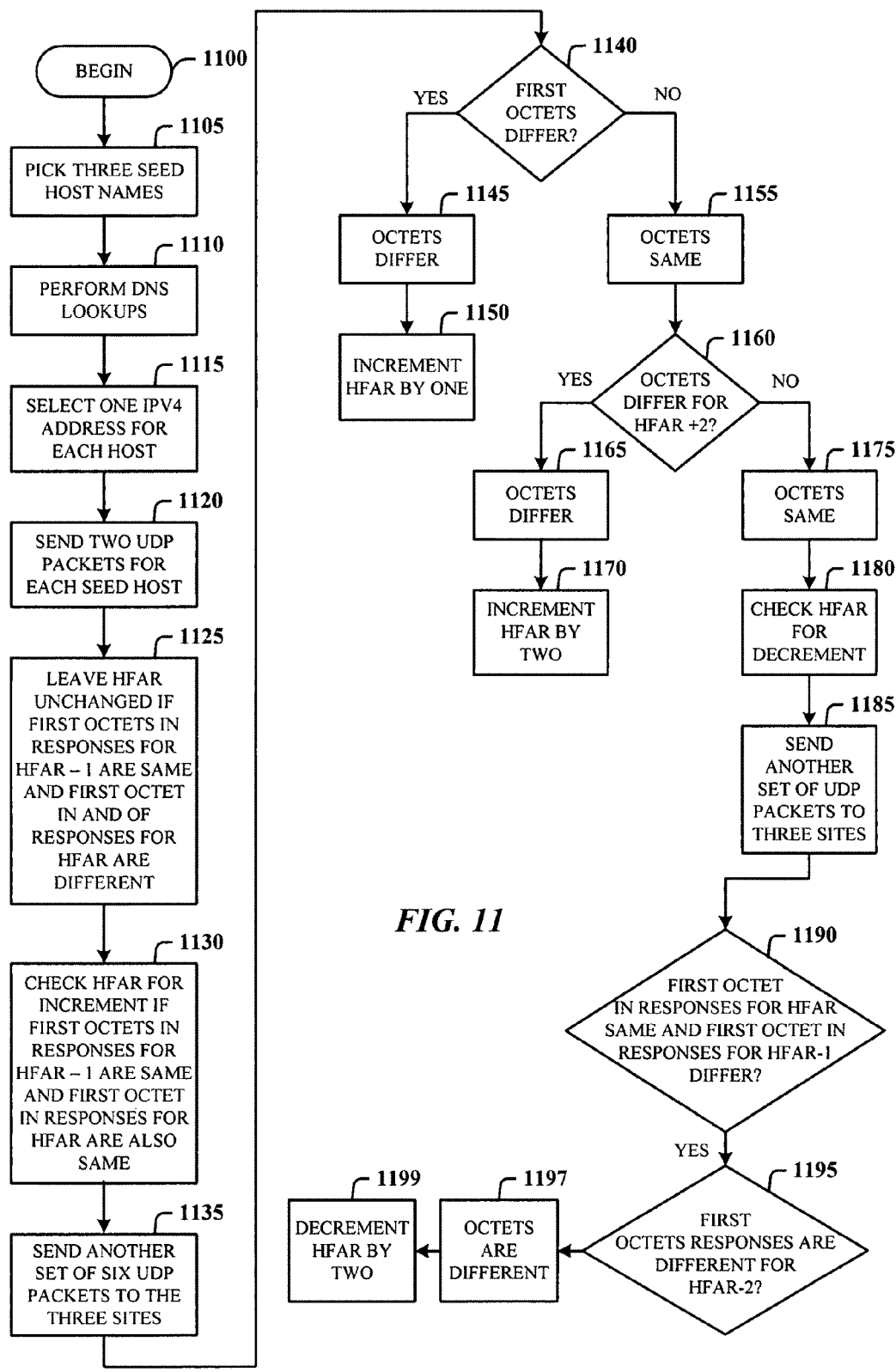
FIG. 11 illustrates network profiling.

FIG. 11 illustrates a method of network profiling when IPv4 is present (i.e., except on an IPv6-only node). At block 1100, the method can begin. At block 1105, the method can pick three seed host names. At block 1110, the method can perform DNS lookups to obtain IPv4 addresses for the three seed host names. At block 1115, the method can select one IPv4 address for each host.

At block 1120, for each of the three seed hosts, the method can send two UDP (or TCP) packets with the following TTL 2-tuple <Hfar−1, Hfar> using the port designated port for traceroute, i.e., 33434. The method can refine Hfar value for the network. The start value for Hfar can be 6. Selecting a default value of Hfar as 6 can allow it to be refined by +/−2, i.e., allowing it to take values between 4 and 8. Hfar normally ranges between 4 and 8. At block 1125, for the three paths, if the first octets in the responses for Hfar−1 are the same and first octet in any of the responses for Hfar are different; the method can leave Hfar unchanged.

At block 1130, for the three paths, if the first octets in the responses for Hfar−1 are the same and first octet in the responses for Hfar are also same; the method can check Hfar for increment. At block 1135, the method can send another set of six UDP packets with TTL tuple <Hfar+1, Hfar+2> to the three sites. At block 1140, the method can determine if for the three paths, the first octets in the responses for Hfar+1 differ. If the determination is yes 1145, the method can increment Hfar by one 1150. If the determination is no 1155 (the first octets do not differ), the method can determine whether the octets differ for Hfar+2 at block 1160. If the determination is yes 1165, Hfar can be incremented by two 1170.

If the determination is no 1175, for the three paths, if the first octets in the responses for Hfar−1 are the different, the method can check Hfar for decrement 1180. At block 1185, the method can send another set of six UDP packets with TTL tuple <Hfar−2, Hfar−1> to the three sites. At block 1190, the method can determine if for the three paths, the first octet in the responses for Hfar−2 are the same and the first octet in the responses for Hfar−1 differ. If the determination is yes, Hfar can be decremented by one. At block 1195, the method can determine whether if for the three paths, the first octets in the responses for Hfar−2 are different. The determination is yes 1197, Hfar can be decremented by two 1199.

IPv6

For IPv6 networks, site prefixes can be used in determining connectivity status. Site prefixes are retrieved from stack query and arrival of a packet from a destination with different site prefix is used to indicate presence of Internet connectivity. This can be a more accurate measure than Hfar because there can be destinations inside one's site/Intranet whose hop count is larger than Hfar.

IP Passive Analyzer

FIG. 7 summarizes connectivity states maintained by a passive analyzer per interface. There are three types of packets: I-packets arrive from an IPv4 source beyond Hfar, or from an IPv6 source outside the IPv6 site; L-packets arrive from an IPv4 source outside the IPv4 subnet but before Hfar, or from an IPv6 source outside the IPv6 subnet but within the IPv6 site; and, S-packets arrive from a source with the same subnet prefix.

Depending on the starting state, other states can be reached based on the packets received. If at a no connectivity state 800, move to Internet connectivity state if received I-packet 802, move to local connectivity state if received L-packet 804, move to subnet connectivity state if received S-packet 806 or successfully received NRDG response from the default gateway 808, and stay in no connectivity state if media disconnect 810 or NRDG failed 812.

If at a subnet connectivity state 814, move to no connectivity state if no received S-packet for thirty seconds (see below for improvements using the connection oriented path information) and NRDG failed 815 media disconnect 816, move to local connectivity state if received L-packet 818, move to Internet connectivity state if received I-packet 820, and stay in subnet connectivity state if received S-packet 822 or successful NRDG 824.

If at a local connectivity state 826, move to subnet connectivity state if no received L-packet for thirty seconds (see below for improvements using the connection oriented path information) 828, move to Internet connectivity state if received I-packet 830, move to no connectivity state if media disconnect 832, and stay in local connectivity state if received L-packet 834.

If at an Internet connectivity state 836, more to local connectivity state if no received I-packet for thirty seconds (see below for improvements using the connection oriented path information) 838, move to no connectivity state if media disconnects 840, and stay in Internet connectivity state if received I-packet 842.

The Passive Analyzer can start when a client application subscribes for Internet connectivity status. Passive Analyzer is stopped when no client has subscribed for Internet connectivity information.

Triggered Probing

Figure 12:
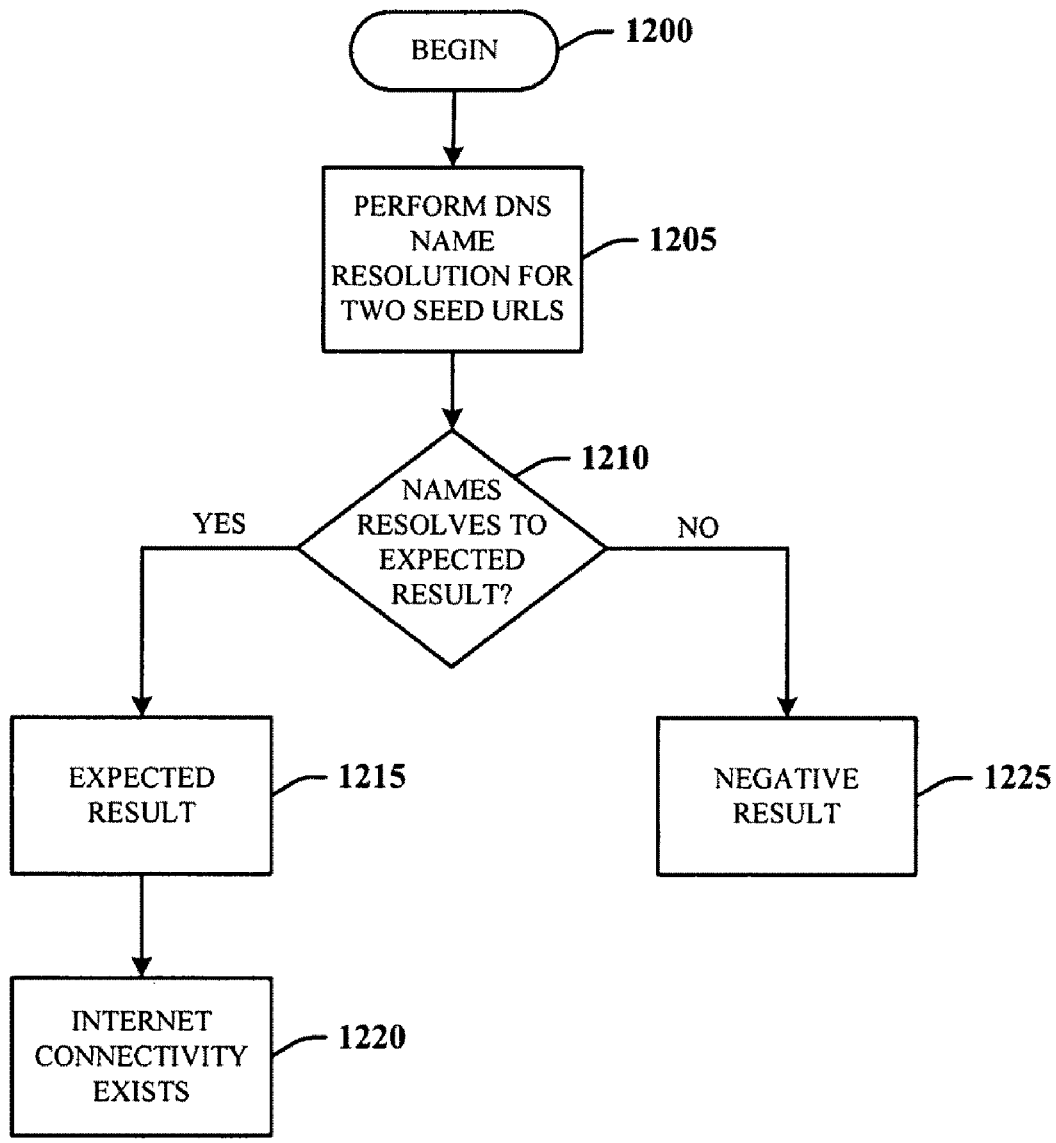
FIG. 12 illustrates triggered DNS probing.

Triggered Probing 240 (of FIG. 2) can be used when an application desires current determination of network connectivity status and the status could not be determined by the Passive Analyzer. FIG. 12 illustrates a method of triggered probing. The method can begin at block 1200 using DNS name resolution. At block 1205, the method can perform a DNS name resolution for two seed names (e.g., ncsi.microsoft.com) with different authoritative DNS servers using a TTL of the DNS entries for these names of 60 seconds in the authoritative DNS servers. At block 1210, the method can determine if either of the names resolves to an expected result. If the determination is yes 1215, the method can determine Internet connectivity exists 1220. If the determination is negative 1225, the method can determine Internet connectivity does not exist. The details of the actual names used, what record type is resolved, and the expected value is left open to a program designer.

Direct Probing

Figure 13:
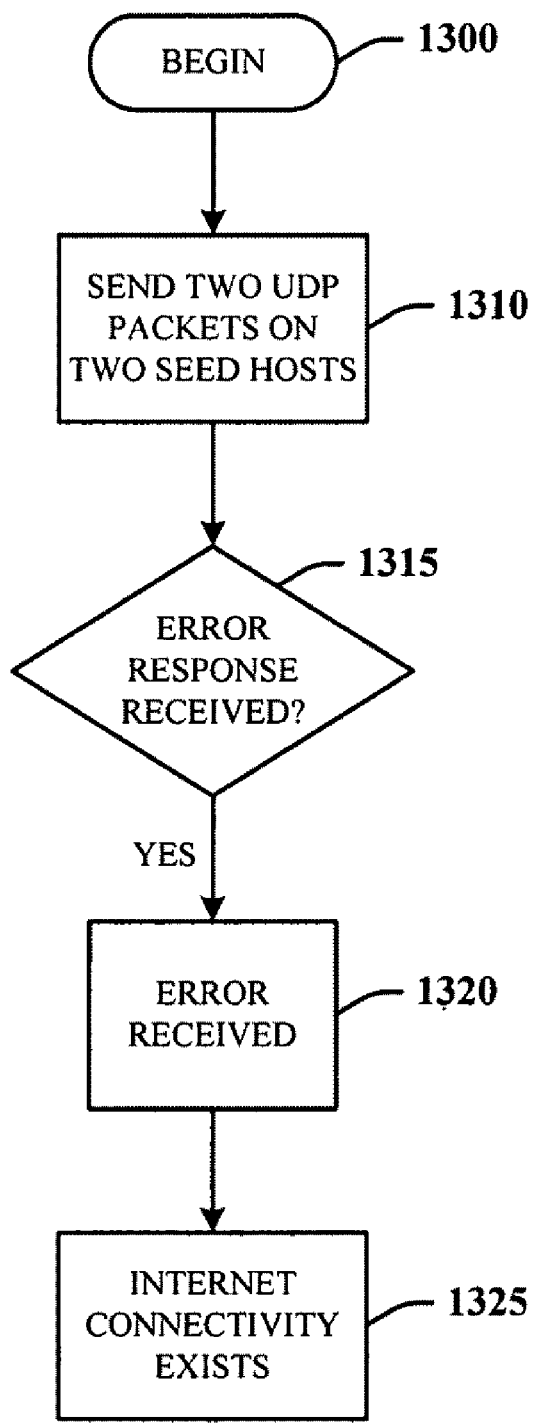
FIG. 13 illustrates direct DNS probing.

Direct probing 245 (FIG. 2) can also be used. FIG. 13 illustrates a method of direct probing. The method can begin at block 1300. At block 1310, the method can send two UDP packets destined to the traceroute port (33434) on two seed hosts with TTL larger than Hfar+1. The method can determine if an ICMP time-exceeded error or an Address/Port/Protocol unreachable error response is received 1315. If the determination is yes and an error is received 1320, the method can determine Internet connectivity exists 1325.

Connectivity status per interface can be maintained in an in-memory cache along with a time stamp. When multiple requests from applications arrive and the cache entry is within five seconds, the method can not perform probing and status from the cache can be returned.

Autodial

Network Profiler or Triggered Probing can trigger a dialup connection if it is not already up when autodial is enabled. If autodial is enabled on local host or remote Internet gateway device (IGD), Passive Analyzer will gather the knowledge of previous packet send attempts to remote destinations. Packets, either by Network Profiler or by Triggered Probing, would be sent only if there were previous send attempts.

Network Connectivity Determination Based on Passive Analysis of Connection-Oriented Path Information and Packet Counts Alternative implementations of the previously-described mechanisms include realtime methods of analyzing TCP path information and/or send/receive packet counts to infer loss of certain network connectivity, which greatly improves the accuracy and responsiveness of detecting network connectivity losses. The alternative implementation employs suspect states in associated with connectivity nodes in the state diagram of FIG. 7. Additionally, the innovation finds particular application to web proxy systems for improving the determination of network connectivity in the presence large numbers of network entities (e.g., clients, other servers) seeking access to other networks.

It is difficult to passively detect network connectivity losses when the root cause of the connectivity loss is with network elements beyond the local computers and systems. Typically, active detection systems send some form of network requests out to test if the desired connectivity still exists. However, existing network traffic generated by normal user usage often provides such information in various ways without explicitly generating extra network traffic. One readily available source of such information is from existing TCP information (in a TCP/IP implementation).

TCP is a reliable transport protocol that has a built-in mechanism to detect packet losses and automatically re-transmit the packets. This information is very useful in understanding the reach-ability of remote destinations without actively sending packets to these remote systems. In general, it can indicate three kinds of reachability state to a particular remote destination: reachable, unreachable, and cannot reach. A remote host (or system) is reachable if TCP receives responses from the remote host. A remote host is unreachable if a TCP connection was in-process, but currently experiences retries and timeouts. A cannot-reach state is where no prior connection was in-process, and a new TCP connection can not be established to the desired remote host. In other words, the remote host could be non-existent, unavailable, unreachable, or blocked by firewalls or other network security measures.

If during some period of time, based on this path reachability information from the stack path information (e.g., TCP), all remote hosts are either unreachable or cannot be reached, and none of the hosts are reachable, it is likely that some level of network connectivity is lost. This passive knowledge can serve as an indication of potential connectivity loss events to trigger further analysis.

Another useful set of events for indicating potential connectivity losses is via analysis of the changes in send-packet counts and receive-packet counts. This is particularly useful when only connectionless network traffic is present, for example, DNS name resolution is often done via connectionless UDP packets. When application level knowledge of such packet loss is not available, a general detection mechanism can be devised using send/receive packet counts. An increase on the send-packet count but not on the receive-packet count can be an indication that some network requests have been sent out but no response has been received, which often indicates the possibility of a network connectivity issue.

Figure 14:
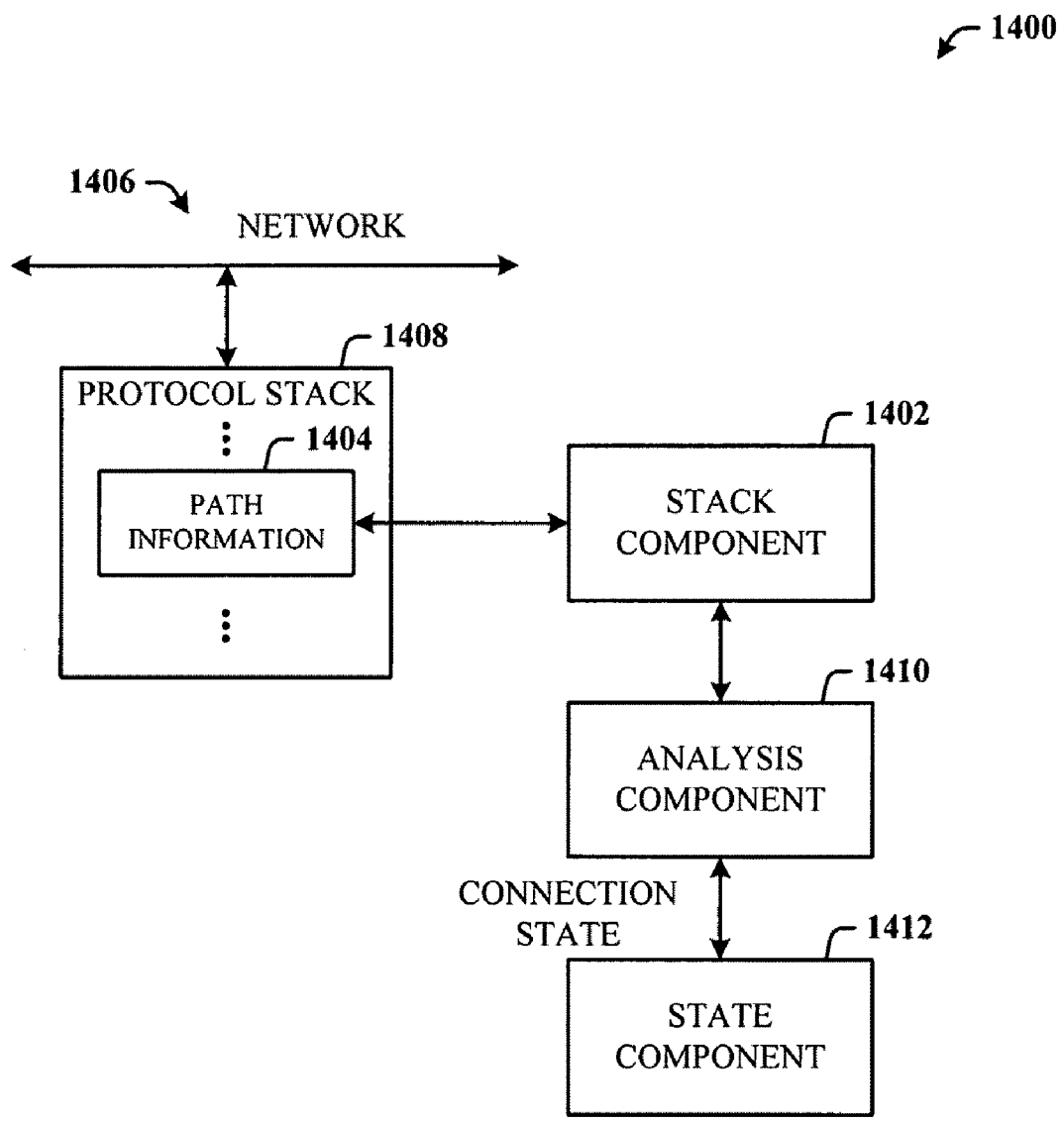
FIG. 14 illustrates a computer-implemented system for determining network connectivity.

FIG. 14 illustrates a computer-implemented system 1400 for determining network connectivity. The system 1400 can include a stack component 1402 for obtaining connection-oriented path information 1404 of a connection 1406 from a protocol stack 1408. The protocol stack 1402 can be TCP/IP, for example. The system 1400 can also include an analysis component 1410 for computing and outputting state information for the state of the connection 1406 based on analysis of the path information 1404. The system 1400 can further comprise a state component 1412 that receives the connection state information and changes connection state based thereon. For example, if the connection state, as analyzed and computed by the analysis component 1410, indicates that state of the connectivity is questionable, the state component 1412 can cause transition from one state to another state. The transitioning can be based on one or more factors, as detected and processed by the system 1400. Moreover, the transitioning can be from a first operational state to a reduced or downgraded state (e.g., suspect), until conditions are such that allow upgrading or downgrading to other states or transitioning back to the first state.

The outputted connection state information can be simply a binary state of "go/no-go" as to the connection state. In more robust implementations, the connection state can be graduated such as reachable, unreachable or cannot be reached, for example. This can be configured to the particular implementation of the connectivity detection architecture. More specifically, this can be based on the type of information consumer. For example, it can suffice that one consuming system only chooses to know if the connection is online. In other words, timeliness is an important factor in making the connection and transacting the packets. In another example, timeliness may not be as important, such that if the connection is deemed unreachable, the connection state can still be computed, but the associated systems can afford to wait and attempt reconnection without significant impact on the system processes. This type of processing is more conducive to system-system connectivity processing rather than user-system (e.g., user-to-website) where direct user frustration can be an important factor in cost to the business, for example.

Figure 15:
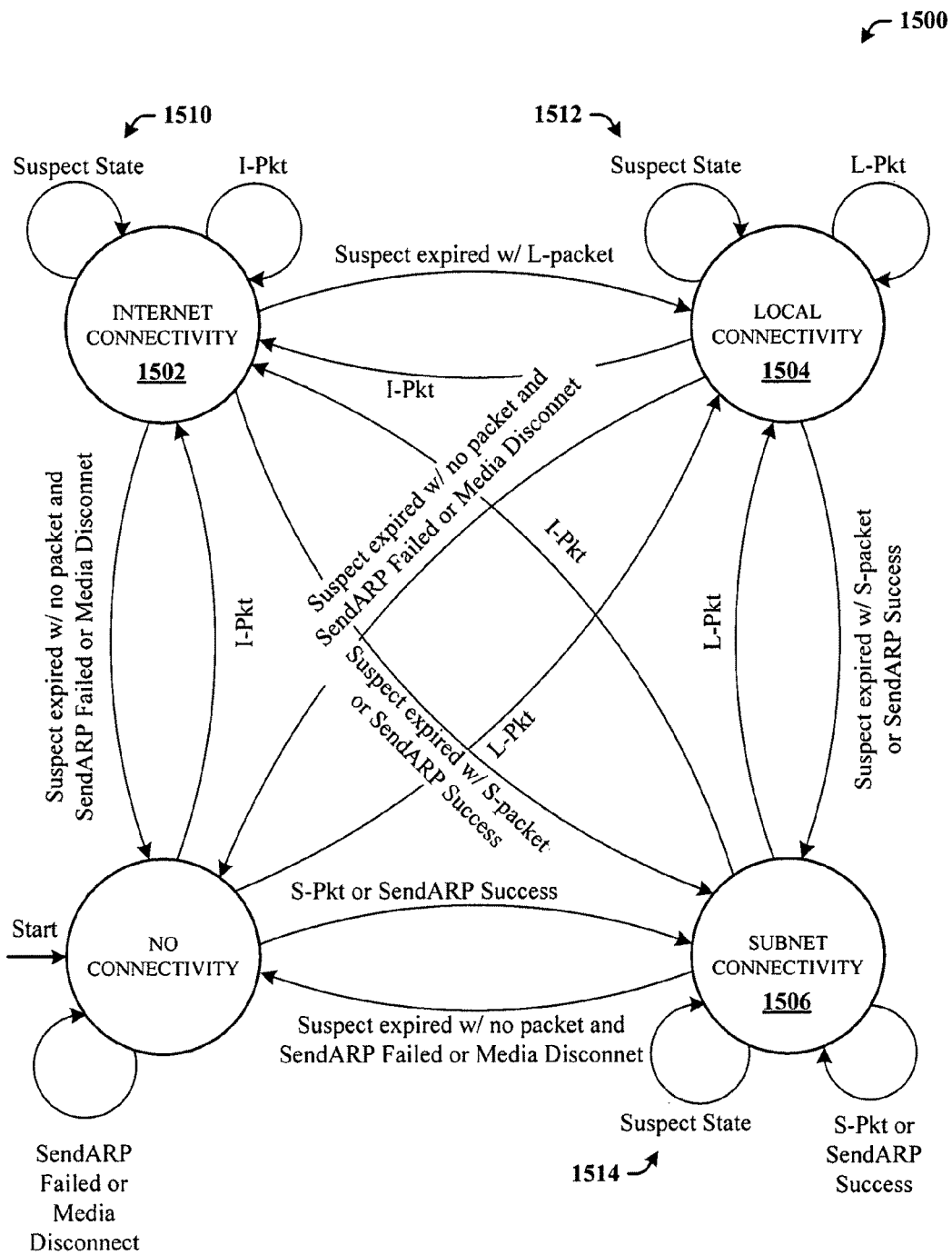
FIG. 15 illustrates a state diagram that includes selectively implemented suspect substates to state connectivity nodes.

FIG. 15 illustrates a state diagram 1500 that includes selectively implemented suspect substates to state connectivity nodes. State diagram 1500 improves on the earlier method illustrated in FIG. 7 by including path information analysis and adding suspect substates to state connectivity nodes. The improvement is based on passive knowledge obtained from the path information of the stack (e.g., TCP/IP) for determining network connectivity status. In one particular instance, an improvement is associated with deciding when to downgrade (or change) connectivity status. The improvement includes, for each connectivity state (of Internet connectivity 1502, local connectivity 1504 and subnet connectivity 1506, except a no-connectivity state 1508), adding a corresponding substate: an Internet suspect state 1510 for node 1502, a local suspect state 1512 for node 1504, and a subnet suspect state 1514 for node 1506.

State transitioning is facilitated by the state component 1412. The analysis component 1410 tests for connection state when the state is not readily determined. Once determined, the state component 1412 processes the transition. When one or more of the following conditions is met, the current connectivity state is moved into the associated suspect state. The suspect state is obtained when: new unreachable paths or new cannot-reach paths are determined, but no new or refreshed reachable paths are determined; and/or, the packet send-count increases, with no corresponding increase in the receive count.

The suspect substate is canceled (restored to the original state from which it was moved) if one or more of the following conditions occur: packets are received indicating an equivalent or higher connectivity level (e.g., received an I-packet when in a suspect state for Internet connectivity); and/or, a new reachable path is detected if the state for the node is moved into the suspect state due to unreachable or cannot reach paths.

In one implementation, state processing in the suspect state expires after operating in that state for a predetermined amount of time without being cancelled. The state to which the suspect state will transition will be the kind of connectivity level observed during the period while in the suspect substate. For example, if only L-packets (for the local connectivity) are detected during the Internet suspect state 1510, based on path information analysis by the analysis component 1410, the state component 1412 will effect transition from the Internet suspect state 1510 to the local connectivity state 1506 when the Internet suspect state 1510 expires. Similarly, if only S-packets (for the subnet connectivity) are detected during the Internet suspect state 1510, the transition from the Internet suspect state 1510 will be to the subnet connectivity 1506 when the Internet suspect state 1510 expires. However, if both L-packets and S-packets are observed during the suspect state, the state component 1412 will effect transition from suspect state to the highest level associated with the observed packets, or the local connectivity state (for the L-packets).

If no packets have been observed, local probing processes will be performed by the analysis component 1410 to determine the appropriate connectivity level for the transition from the suspect state (1510, 1512 or 1514). For example, a local probing can be performed by sending a neighbor resolution request (for both IPv4 and IPv6) to the default gateway 350 of FIG. 3 and moving to the no-connectivity state 1508 if the probing fails. Alternatively, or in combination therewith, the local probing can be by sending one or more DNS requests to the DNS servers 360 of FIG. 3 or 480 of FIG. 4 to generate additional traffic in that will help determine local/subnet connectivity levels when no traffic is observed during the suspect state.

In one implementation, when considering to move Internet connectivity status from the Internet connectivity state 1502 to the associated suspect state 1510, only paths to non-local remote hosts are considered. In an alternative implementation, paths to other local remote hosts can be considered. Non-local remote hosts are defined as remote hosts having a hop count greater than Hfar, or not part of the current local network(s). The local network(s) can be inferred from addresses associated with DNS servers, DHCP (dynamic host configuration protocol) servers, subnet addresses, proxy servers, and so on. IPv6 site local addresses or addresses with the same site prefix are also considered to be part of local networks.

When in a proxied network environment where proxy servers are discoverable via protocols such as WPAD (web proxy auto-discovery), for example, new reachable paths to proxy servers can be treated the same way as receiving an I-packet, so that an Internet connectivity status can be confirmed, in this case.

From DNS clients, additional information on the reachability of DNS servers (e.g., the DNS servers 360 of FIG. 3) can also be used to improve the accuracy and responsiveness of the Internet connectivity status determination. Oftentimes, multiple DNS servers are configured so that the DNS client on a local machine can contact any of the servers host name resolving in case one or more of the DNS servers goes offline or becomes unavailable. Substantially all network applications start with DNS requests before trying to communicate with other remote hosts. Thus, a failure to communicate with all of the DNS servers is a strong indication of lost network connectivity. When this happens, the connectivity status can be no better than local connectivity 1504 and will be transitioned into the associated suspect state 1512 for further downgrading of the connectivity levels.

Figure 16:
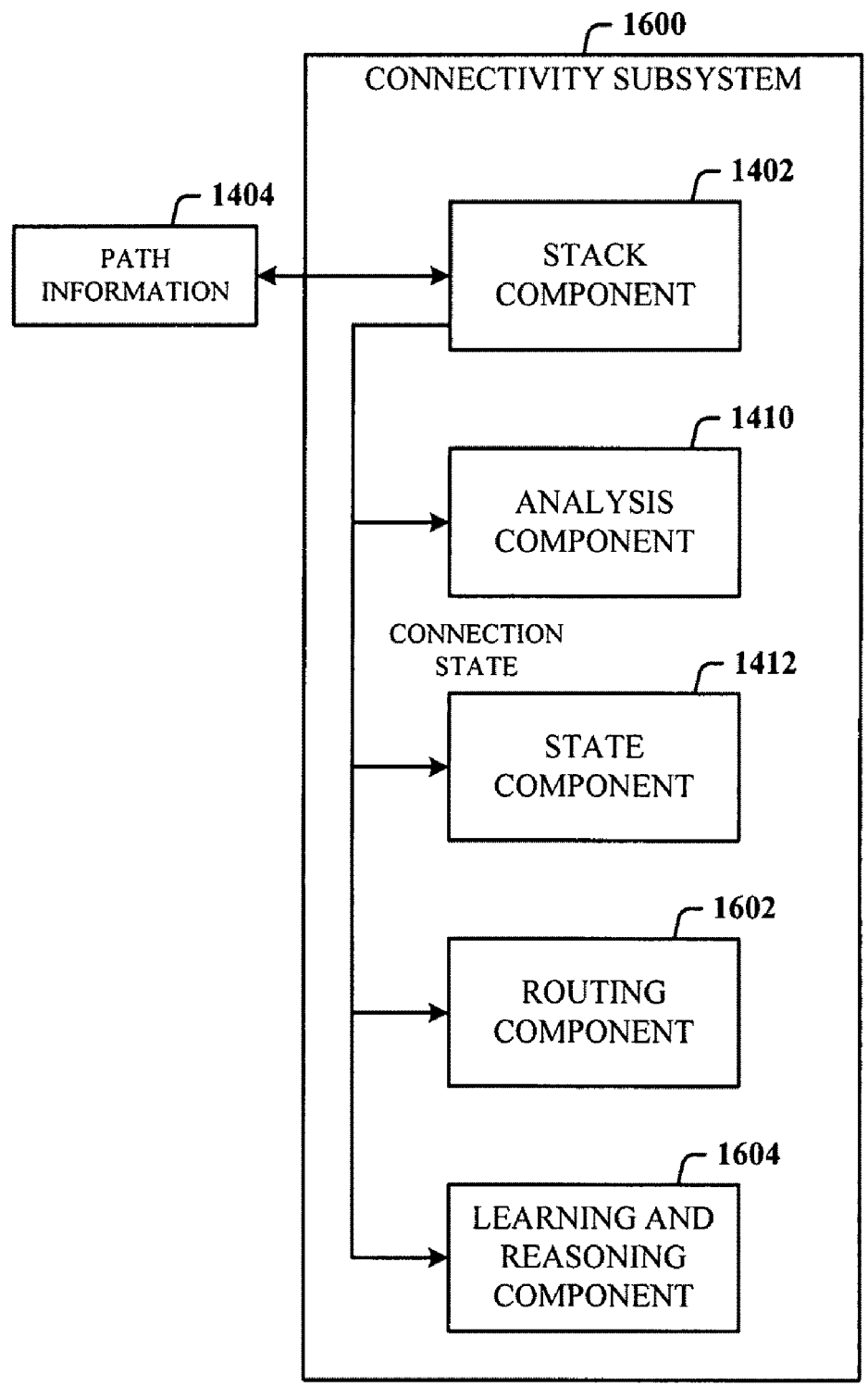
FIG. 16 illustrates a connectivity subsystem that can be employed to provide connectivity state determination and transitioning in accordance with the innovation.

FIG. 16 illustrates a connectivity subsystem 1600 that can be employed to provide connectivity state determination and transitioning in accordance with the innovation. The system 1600 includes the stack component 1402, the analysis component 1410 and state component 1412 described hereinabove. Additionally, the subsystem 1600 can include a routing component 1602 for processing the routing of packets differently (e.g., to different remote locations) based on the connectivity state. For example, if the state (as determined by the analysis component 1410) should be downgraded to a suspect state, the routing component 1602 can process this information to effect connecting to a different router, gateway, proxy server, etc., based on the downgraded state. Similarly, when transitioning back to the connectivity state from the suspect state, the routing component 1602 again, can change the routing, if desired, to a different network system, although this is not required. It is to be appreciated, however, that certain clients may be associated with a certain proxy server (or servers) such that when possible (e.g., during an upgraded state transition) the client is re-connected (or rerouted) back to the originally associated proxy system.

The routing component 1602 can include a single network interface device NID (or card) or multiple NIDs (or cards). For example, it is becoming more commonplace for device vendors to provide not only wired connection capability (e.g., Ethernet, USB, IEEE 1394), but also wireless connectivity capability (e.g., IEEE 802.11x, Bluetooth, Wi-Fi, Wi-Max). Accordingly, for example, based on transition to the suspect connectivity state of the wired connection, the routing component 1602 of subsystem 1600 can facilitate switching connectivity to the wireless connection automatically and dynamically. Similarly, based on transition to the suspect connectivity state of the wireless connection, the routing component 1602 can facilitate switching connectivity to the wired connection automatically and dynamically. These transitions occur in realtime and transparently to the user and/or to the applications operating over the connection(s).

The subsystem 1600 can also employ a learning and reasoning (LR) component 1604 that interfaces to one or more of the stack, analysis, state and routing components (1402, 1410, 1412 and 1602) to learn and reason about processes executed therein. For example, the LR component 1604 can monitor processes associated with the stack component 1402 related to path information 1404 for different devices and systems, and based on this learned information, cause automatic routing to occur by the routing component 1602 to the desired proxy server or servers. More specifically, if it is learned that at certain times of the day (a "peak" time), that the Internet connectivity state frequently transitions to its suspect state (as learned from the state component 1412), for unknown reasons, the LR component 1604 can cause the connection to change before that time to a different, but more reliable proxy server, for example, to provide a more reliable connection at that time period. Similarly, when the "peak" time subsides, the LR component 1604 can cause Internet connectivity to route back to the original proxy system. That can be due in part to adjust for loading on the system of proxy servers, for example.

In another example, the LR component 1604 can monitor the analysis component 1410 for send and receive counts and learn about which systems and/or connections experience suspect states or failure modes, the time of day, day of week, etc., and even the user and user device normally associated with these states.

In yet another example, the LR component 1604 can monitor all suspect states and the networks (e.g., Internet, local, subnet) associated therewith for activities that tend to be associated with or factors related to transitioning between the suspect and connectivity states. These are only but a few examples of automated functionality that can be provided and are not to be construed as limiting in any way. As can be seen, the flexibility provided by the components described herein can provide significant improvements over conventional architectures.

As described briefly, the subject architecture can employ various LR-based schemes for carrying out various aspects thereof. For example, a process for determining learning about timeouts for suspect state transitions can be facilitated via an automatic classifier system and process. A classifier is a function that maps an input attribute vector, x=(x1, x2, x3, x4, xn), to a class label class(x). The classifier can also output a confidence that the input belongs to a class, that is, f(x) =confidence (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" can include making a decision based on a predetermined set of fixed criteria. This can also refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data.

Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

It is further to be understood that the subsystem 1600 need not include all of the illustrated components. For example, it is not a requirement that the LR component 1604 be included in the system 1600. This component 1604 can be hosted in a separate system or not employed at all. Similarly, it is not a requirement that the routing component 1602 be included as part of the system 1600. In other words, based on output of the connection state from the analysis component 1410, the device operating system can be employed to switch connections (e.g., wired to wireless) or route the single connection to a different proxy server. It is also to be understood that the routing component 1602 can be deployed as a card in itself rather than software, such that the card plugs into the device or system in order to obtain the desired functionality. Other components can be employed in the same manner.

Figure 17:
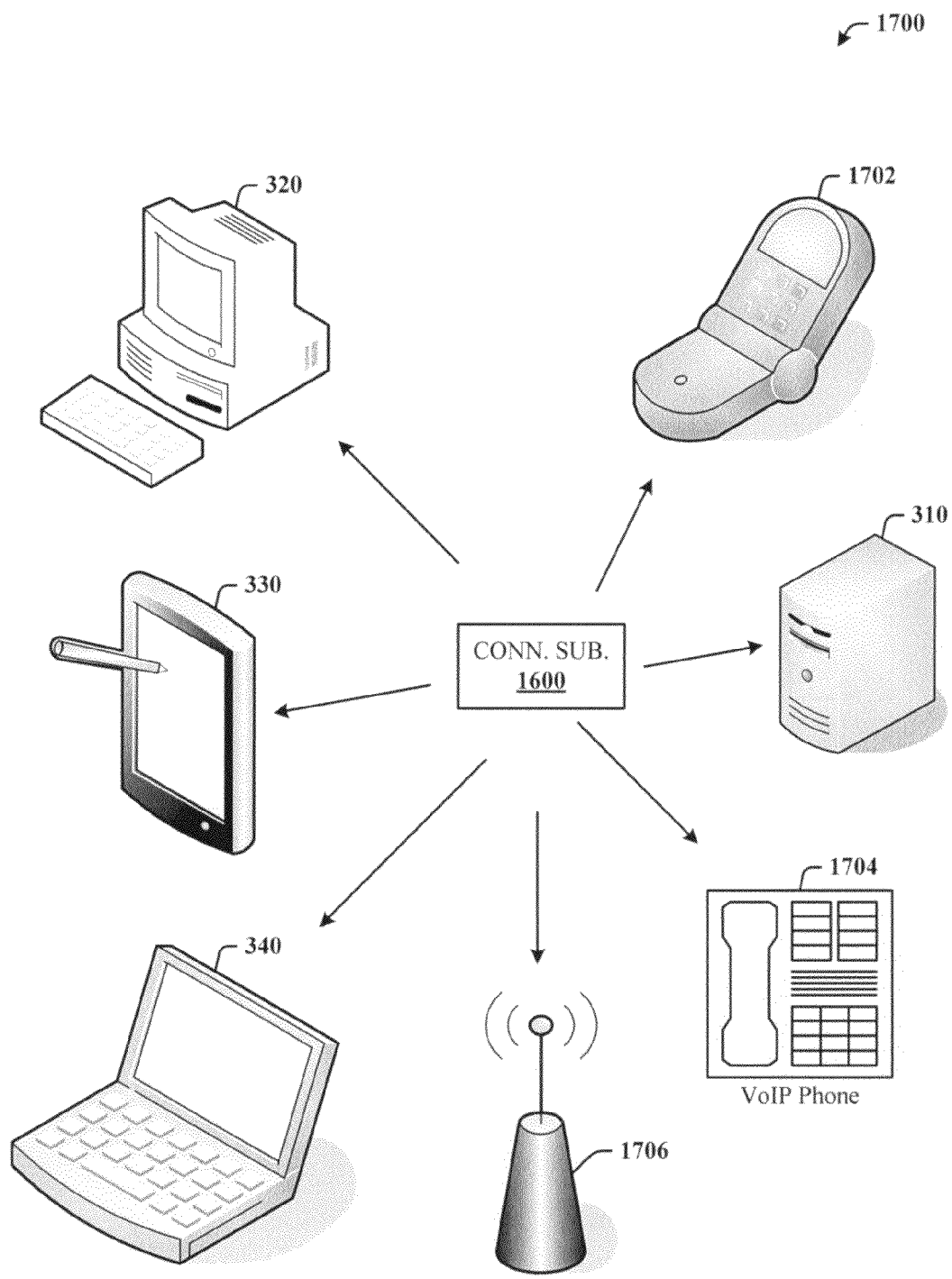
FIG. 17 illustrates a set of devices and/or systems that can employ the subsystem of FIG. 16.

FIG. 17 illustrates a set 1700 of devices and/or systems that can employ the subsystem 1600 of FIG. 16. For example, the web proxy server 310, desktop computing system 320, handheld device 330 and laptop 340 of FIG. 3 can include one or more of the components (1402, 1420, 1412, 1602 and 1604) of the connectivity subsystem 1600. Similarly, a cell phone (e.g., smart phone) 1702, a digital (VoIP-voice over IP) phone 1704 and an access point 1706 can include the subsystem 1600 to gain the benefits thereof.

Figure 18:
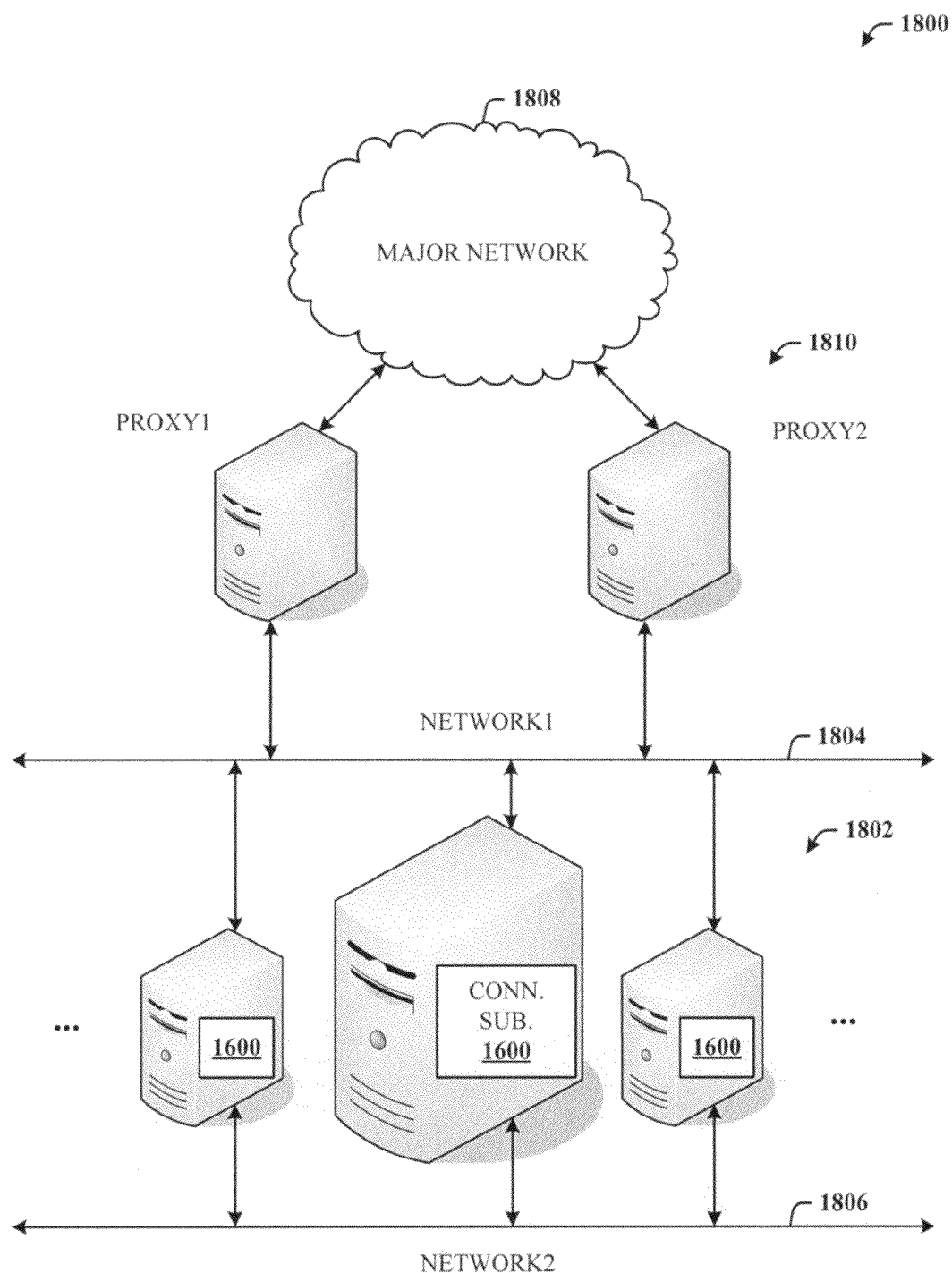
FIG. 18 illustrates a server system that can employ state processing for network connectivity in accordance with the innovation.

FIG. 18 illustrates a server system 1800 that can employ state processing for network connectivity in accordance with the innovation. Here, the system 1800 includes a server "farm" 1802 of computers operating to perform the desired functions for larger numbers of users and processes. For example, such systems 1800 are utilized for leasing or renting computing time for large processing tasks (e.g., weather forecasting, scientific modeling, etc.), and thus, should provide high availability of the servers 1800 for the required time period and for the given tasks. In other words, downtime, lost, or interrupted connectivity can impact the processes and costs to complete such longterm tasks.

In support thereof, the farm 1802 include multiple computing systems, which can be connected to dual or redundant networks, for example, a first network 1804 and a second network 1806. Additionally, access to a major network 1808 (e.g., the Internet or a private academic or scientific network) can be facilitated via one or more proxy servers 1810 (denoted PROXY1 and PROXY2). The proxies 1810 are shown disposed on the first network 1804; however, it is to be appreciated that the second network can also be connected to these same proxies 1810, or to a set of different but redundant proxy servers (not shown).

In operation, the connectivity subsystems 1600 will operate to monitor connectivity states for each of the farm computers (or servers 1802), and based on the realtime state, route connectivity elsewhere, if needed, to provide continuous connectivity through the proxies 1810, if that is where the routing should be. It is further to be understood that not all of the farm computers 1802 need employ subsystem 1600. For example, one computer connectivity subsystem 1600 could monitor the connectivity states for other computers in the same bank.

Figure 19:
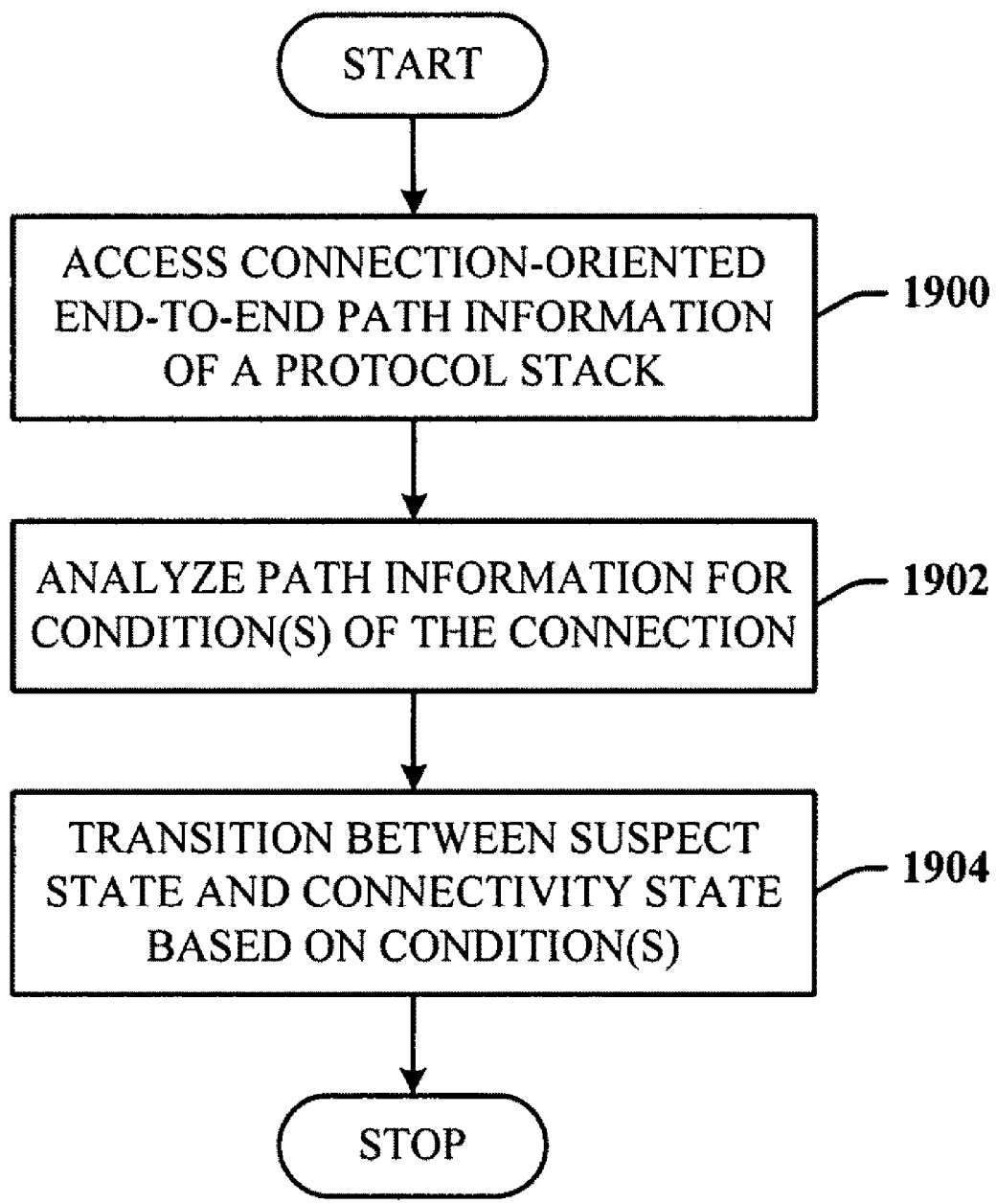
FIG. 19 illustrates a method of determining network connectivity in accordance with the innovation.

FIG. 19 illustrates a method of determining network connectivity in accordance with the innovation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts can, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the innovation.

At 1900, connection-oriented end-to-end path information of a protocol stack is accessed. As described supra, this can be a TCP/IP stack where the path information is obtained from the TCP protocol. At 1902, the path information is analyzed to determine a condition of the connection. For example, the condition can be reachable, unreachable or cannot reach. At 1904, based on the condition(s), the state can be transitioned between a suspect state and a connectivity state.

Figure 20:
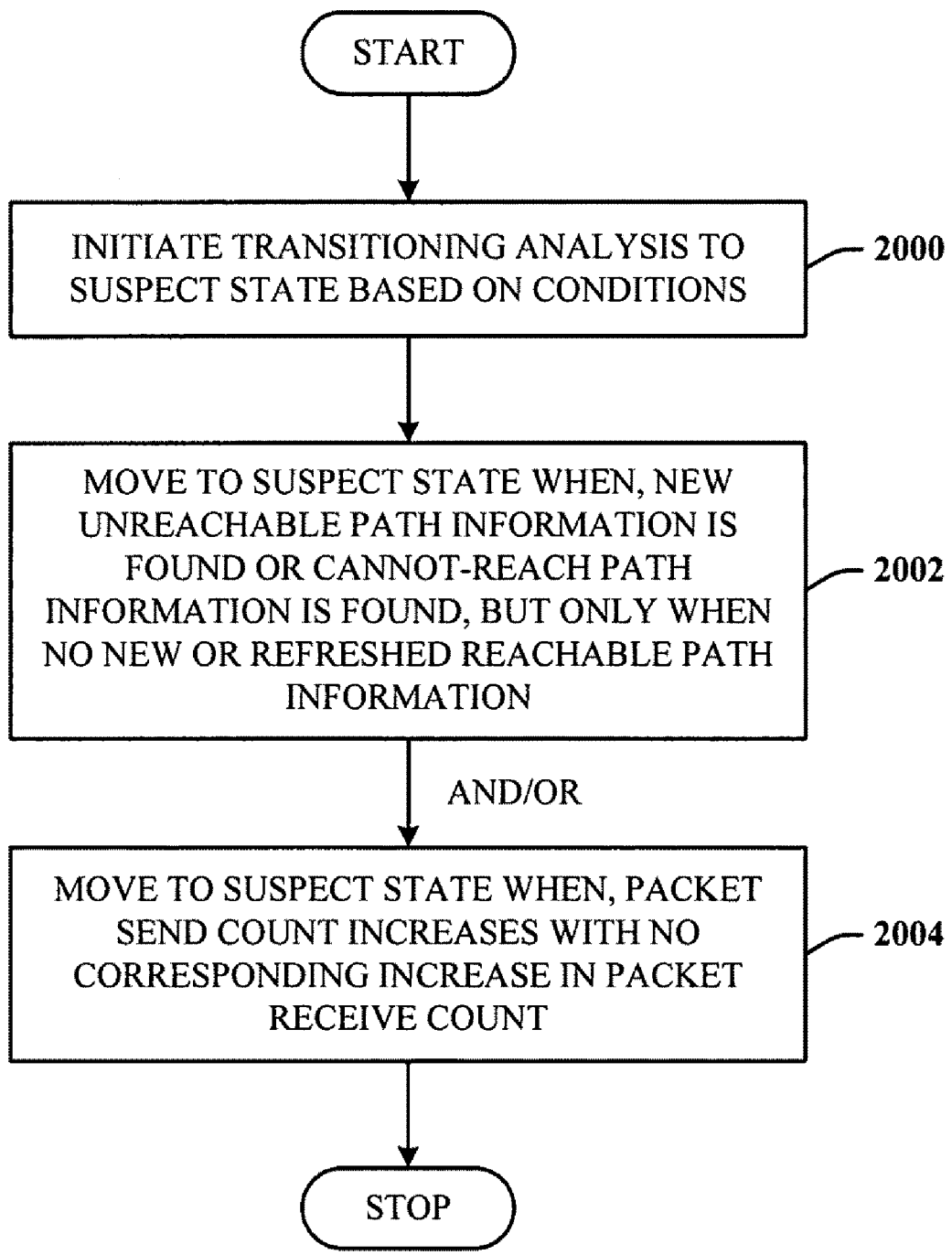
FIG. 20 illustrates a method of transitioning to a suspect state based on connection conditions.

FIG. 20 illustrates a method of transitioning to a suspect state based on connection conditions. At 2000, transitioning analysis is initiated for moving to a suspect state based on path conditions. At 2002, transition is to the suspect state at a connectivity node when: new unreachable-path information is found, or cannot-reach path information is found, but only when no new or refreshed reachable-path information is found. Alternatively, or in combination with 2002, transition to the suspect state can occur when the packet send count increases with no corresponding increase in packet receive count, as indicated at 2004.

Figure 21:
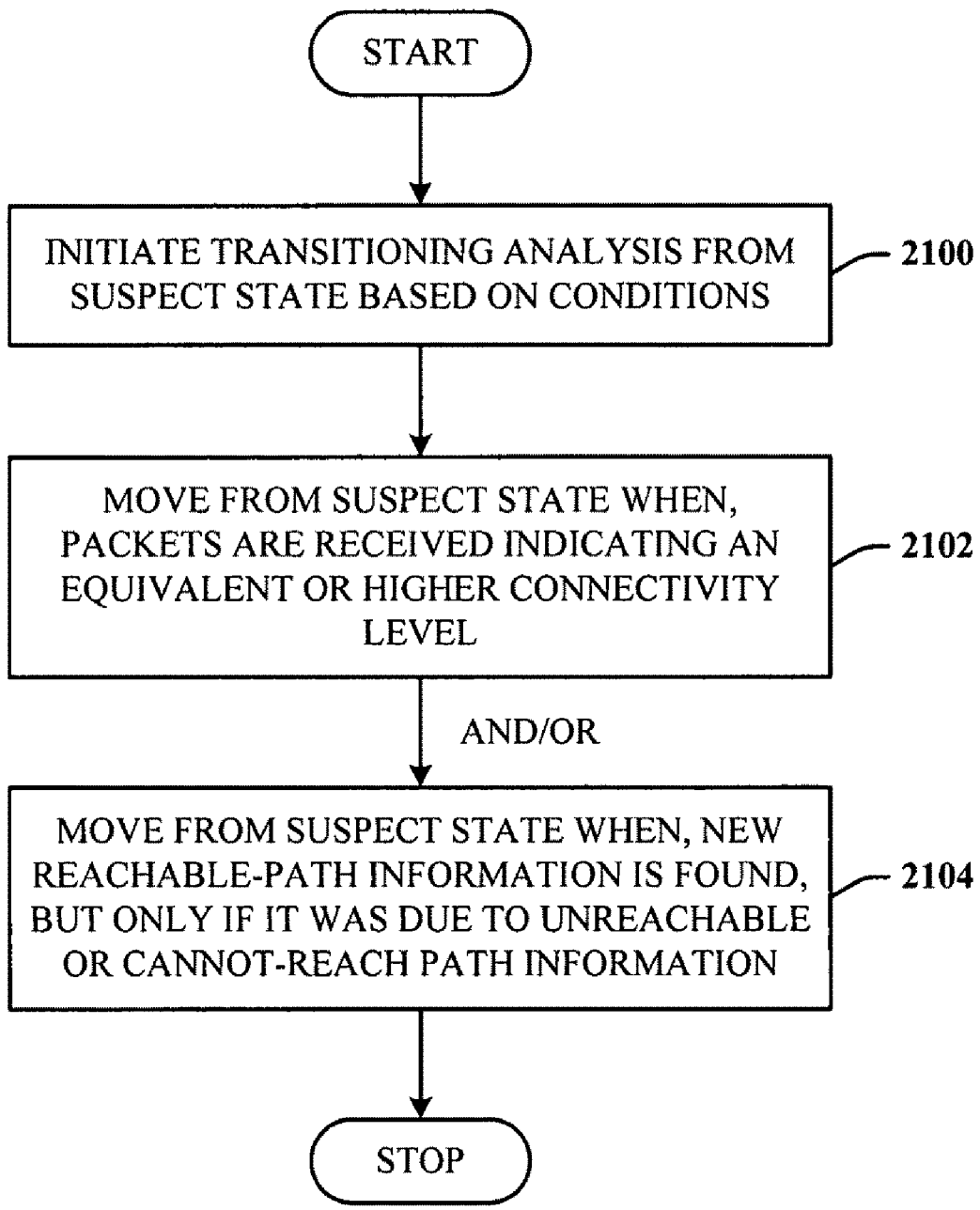
FIG. 21 illustrates a method of transitioning from a suspect state based on connection conditions.

FIG. 21 illustrates a method of transitioning from a suspect state based on connection conditions. At 2100, transitioning analysis is initiated for moving from a suspect state based on path conditions. The suspect state is canceled (or restored to the original connectivity state) if any of the following occur. At 2102, packets are received that indicate an equivalent or higher connectivity level. For example, an I-packet is received when in an Internet suspect state. Alternatively, or in combination with 2102, transition from the suspect state can occur when new reachable-path information is detected, but transition to the suspect states was due to an unreachable path information or cannot-reach path information, as indicated at 2104.

Figure 22:
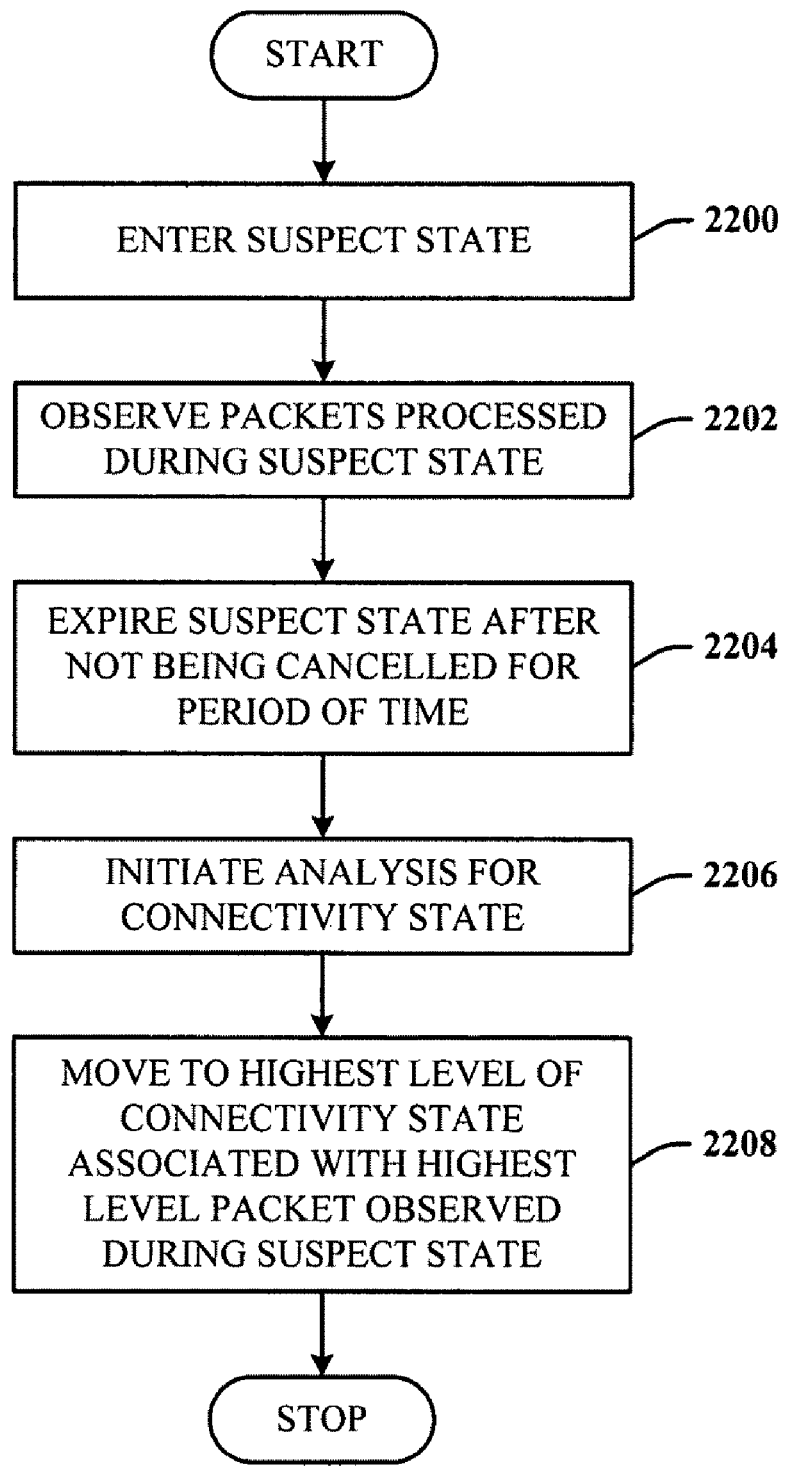
FIG. 22 illustrates a method of determining connectivity state to transition from a suspect state.

FIG. 22 illustrates a method of determining connectivity state to transition from a suspect state. At 2200, the process enters a suspect state. At 2202, packets passed during the suspect state are observed. At 2204, the suspect state is then expired after being in the suspect state for a period of time and not being canceled. At 2206, analysis is initiated to determine the connectivity state to which transition should be made from the suspect state. At 2208, transition is to the level associated with the highest-level packets observed during the suspect state.

Figure 23:
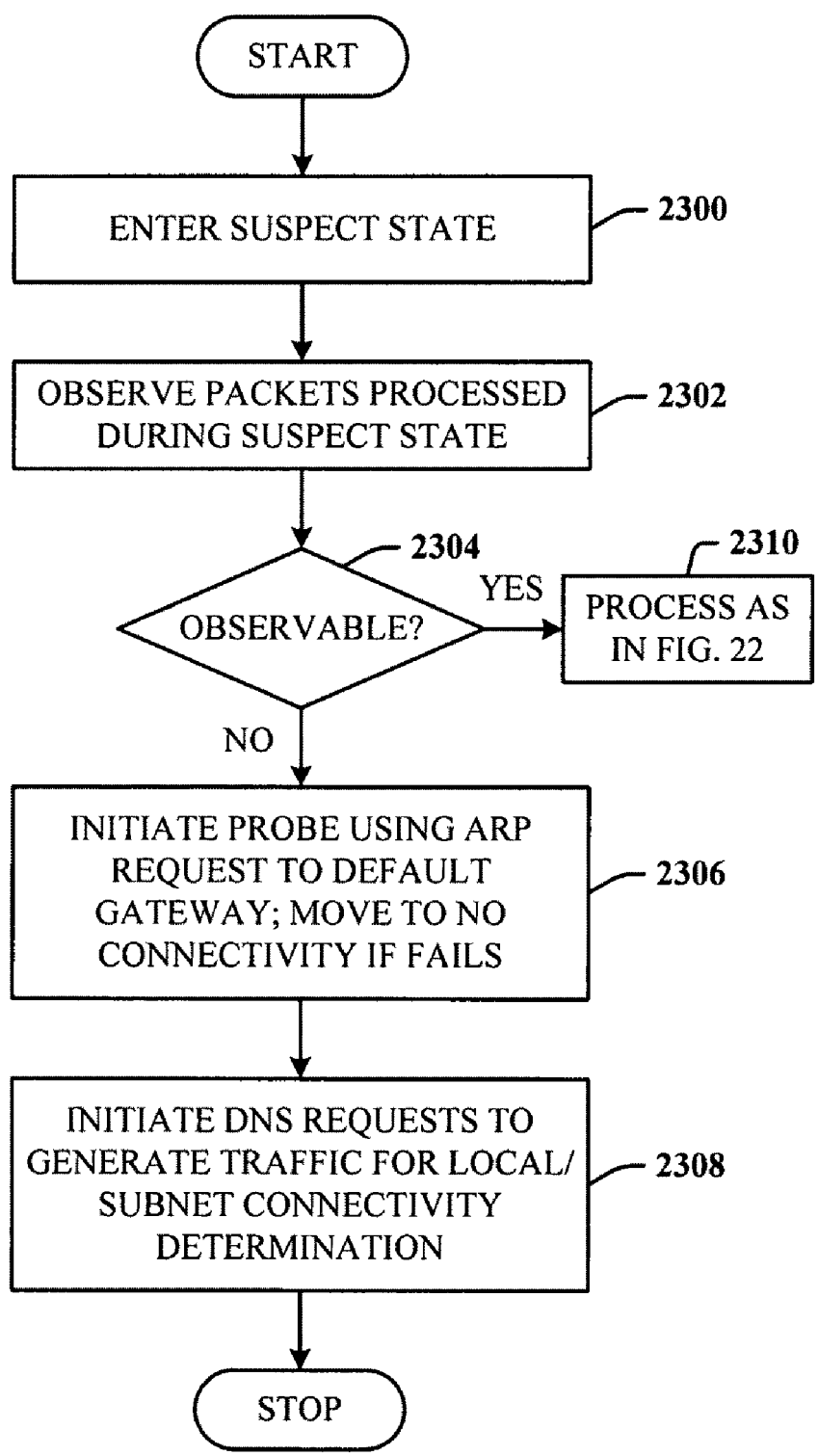
FIG. 23 illustrates a method of probing for connectivity when no packets are observed during a suspect state.

FIG. 23 illustrates a method of probing for connectivity when no packets are observed during a suspect state. At 2300, a suspect state is entered. At 2302, a process is started to observe packets during the suspect state. At 2304, if no packets were observed, flow is to 2306, to initiate probing to determine the state of the connectivity. Probing can be by sending neighbor resolution packets to the default gateway. If the connection fails, then move to the no connectivity state. At 2308, alternatively, or in combination with the process at 2306, DNS requests can be initiated to generate traffic for the local and/or subnet connectivity determination. However, if at 2304, packets have been observed, flow is back to the method of FIG. 22 to process observed packets.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

With reference to the exemplary computing system of FIG. 1, at least the application programs 135 and/or program modules 136 can include the components described herein for suspect state processing. For example, the stack component 1402, analysis component 1410, state component 1412, routing component 1602, and LR component 1604 can be embodied as part of the applications 135 and/or program modules 136. In an alternative implementation, the routing component 1602 can part of the network interface 170 such that routing is provided at the board (or NID or NIC) level.

Figure 24:
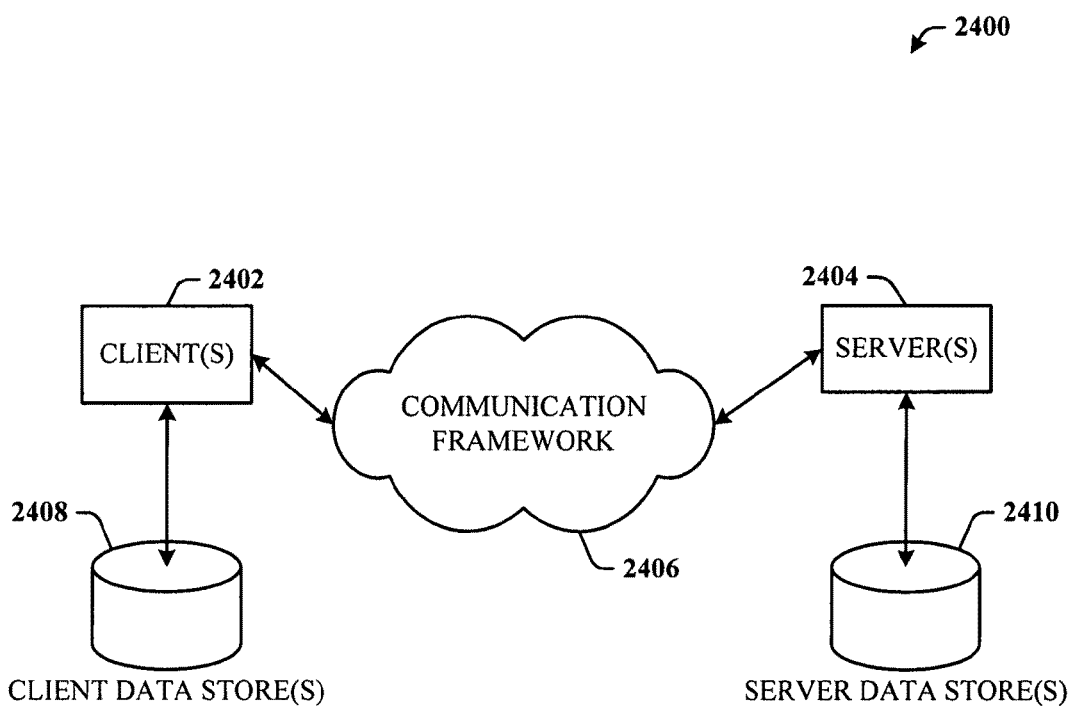
FIG. 24 illustrates a schematic block diagram of an exemplary computing environment that supports connectivity determination using suspect states.

Referring now to FIG. 24, there is illustrated a schematic block diagram of an exemplary computing environment 2400 that supports connectivity determination using suspect states. The system 2400 includes one or more client(s) 2402. The client(s) 2402 can be hardware and/or software (e.g., threads, processes, computing devices). The client(s) 2402 can house cookie(s) and/or associated contextual information by employing the subject innovation, for example.

The system 2400 also includes one or more server(s) 2404. The server(s) 2404 can also be hardware and/or software (e.g., threads, processes, computing devices). The servers 2404 can house threads to perform transformations by employing the architecture, for example. One possible communication between a client 2402 and a server 2404 can be in the form of a data packet adapted to be transmitted between two or more computer processes. The data packet can include a cookie and/or associated contextual information, for example. The system 2400 includes a communication framework 2406 (e.g., a global communication network such as the Internet) that can be employed to facilitate communications between the client(s) 2402 and the server(s) 2404.

Communications can be facilitated via a wired (including optical fiber) and/or wireless technology. The client(s) 2402 are operatively connected to one or more client data store(s) 2408 that can be employed to store information local to the client(s) 2402 (e.g., cookie(s) and/or associated contextual information). Similarly, the server(s) 2404 are operatively connected to one or more server data store(s) 2410 that can be employed to store information local to the servers 2404.

The clients 2402 can include the computer 320, device 330, laptop 340, cell phone 1702, access point 1706, and digital phone 1704, for example. The servers 2404 can include the web proxy server 310, proxies 1810, and server farm server 1802, for example.

What has been described above includes examples of the disclosed innovation. It is, of course, not possible to describe every conceivable combination of components and/or methodologies, but one of ordinary skill in the art can recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for determining network connectivity, comprising:
    a stack component configured to obtain connection-oriented path information from a protocol stack associated with a client;
    an analysis component configured to compute a state of a connection based at least in part on the path information;
    a state component configured to transition the state of the connection, the transitioning comprising at least one of:
        transitioning from a first reachable state to a second suspect state; and
        transitioning from a first suspect state to a second reachable state; and
    a learning and reasoning component configured to employ at least one of a probabilistic and statistical-based analysis to at least one of prognose or infer an action desired to be performed.

2. The system of claim 1, the connection-oriented path information based at least in part on transmission control protocol (TCP).

3. The system of claim 1, the path information representing a connectivity state related to at least one of a reachable, unreachable, or cannot reach state of the connection.

4. The system of claim 1, the analysis component configured to analyze count information related to at least one of a send packet or a receive packet.

5. A computer-implemented system for determining network connectivity, comprising:
    a stack component configured to obtain connection-oriented path information from a protocol stack associated with a client;
    an analysis component configured to compute a state of a connection based at least in part on the path information; and
    a state component configured to transform the state of the connection between a suspect state and a connectivity state and expire the suspect state after a predetermined period of time elapses and the suspect state has not been cancelled.

6. The system of claim 5, the state component configured to automatically transition back to the connectivity state after a predetermined amount of time expires when in the suspect state.

7. The system of claim 5, the analysis component configured to initiate probing to determine the state of the connection when no packets have been observed during the suspect state.

8. The system of claim 5, the state component configured to transition from the suspect state based at least in part on a highest level of observed packets during the suspect state.

9. The system of claim 1, comprising a routing component configured to switch connectivity to another system based at least in part on the computed state.

10. The system of claim 1, the path information of the client related to connectivity to a proxy server.

11. The system of claim 1, comprising transitioning from at least one of the suspect states based at least in part on a highest level of observed packets during at least one of the suspect states.

12. A computer-implemented method of determining network connectivity, comprising:
    accessing connection-oriented end-to-end path information of a protocol stack of a connection;
    analyzing the path information to determine a condition of the connection;
    transitioning between a connectivity state and a suspect state based at least in part on the condition, comprising transitioning from the suspect state based at least in part on received packets that indicate an equivalent or higher connectivity level than a level associated with the suspect state; and
    transitioning from the suspect state based at least in part on a highest level of observed packets during the suspect state, the connectivity state associated with the highest level of at least some of the observed packets.

13. The method of claim 12, comprising transitioning to the suspect state based at least in part on new unreachable path information or new cannot reach path information.

14. The method of claim 12, comprising transitioning to the suspect state based at least in part on an increase in a packet send count with no corresponding increase in a packet receive count.

15. The method of claim 12, comprising expiring the suspect state after a predetermined period of time elapses and the suspect state has not been cancelled.

16. The method of claim 12, the transitioning between a connectivity state and a suspect state comprising transitioning from a reachable state to a suspect state until a state of the connection allows transitioning back to the reachable state.

17. The method of claim 12, comprising transitioning from the suspect state based at least in part on new reachable path information, if a transition to the suspect state was based at least in part on unreachable or cannot-reach path information.

18. The method of claim 12, comprising transitioning from an Internet connectivity state to the suspect state based on paths to non-local remote hosts.

19. The method of claim 12, comprising confirming the connectivity state to a proxy server of a network environment based at least in part on new reachable path information to the proxy server.

20. A computer-implemented system, comprising:
    computer-implemented means for accessing connection-oriented end-to-end path information of a protocol stack of a connection;
    computer-implemented means for analyzing the path information to determine a condition of the connection and compute a state of the connection; and
    computer-implemented means for transitioning the state of the connection between a connectivity state and a suspect state based at least in part on at least one of the condition or a highest level of observed packets during the suspect state, the connectivity state associated with the highest level of at least some of the observed packets.

* * * * *